United States Patent
Hardwick

(10) Patent No.: US 11,990,144 B2
(45) Date of Patent: May 21, 2024

(54) REDUCING PERCEIVED EFFECTS OF NON-VOICE DATA IN DIGITAL SPEECH

(71) Applicant: Digital Voice Systems, Inc., Westford, MA (US)

(72) Inventor: John C. Hardwick, Acton, MA (US)

(73) Assignee: Digital Voice Systems, Inc., Westford, MA (US)

( * ) Notice: Subject to any disclaimer, the term of this patent is extended or adjusted under 35 U.S.C. 154(b) by 100 days.

(21) Appl. No.: 17/387,412

(22) Filed: Jul. 28, 2021

(65) Prior Publication Data

US 2023/0043682 A1 Feb. 9, 2023

(51) Int. Cl.
*G10L 19/00* (2013.01)
*G10L 15/24* (2013.01)
(Continued)

(52) U.S. Cl.
CPC .......... *G10L 19/0208* (2013.01); *G10L 15/24* (2013.01); *G10L 19/005* (2013.01); *G10L 25/18* (2013.01)

(58) Field of Classification Search
CPC ....... G10L 25/90; G10L 19/125; G10L 19/22; G10L 19/18; G10L 19/12; G10L 19/025; G10L 19/10; G10L 19/20; G10L 15/24; G10L 19/02; G10L 19/0208; G10L 19/09; G10L 19/005; G10L 19/087; G10L 19/083; G10L 19/08; G10L 19/06; G10L 19/04; G10L 25/18; G10L 25/03; G10L 21/00; G10L 21/003; G10L 21/06; G10L 19/002; G10L 19/032; G10L 19/028; G10L 21/0208; G10L 21/0316; G10L 2021/02082; G10L 2021/02085; G10L 2021/02087; G10L 2021/02168; G10L 21/0232; G10L 21/0224; G10L 21/0264; G10L 21/0332; G10L 21/034;
(Continued)

(56) References Cited

U.S. PATENT DOCUMENTS 3,622,704 A 11/1971 Ferrieu et al.
3,903,366 A 9/1975 Coulter
(Continued)

FOREIGN PATENT DOCUMENTS

EP 0893791 A2 1/1999
EP 1020848 A2 7/2000
(Continued)

OTHER PUBLICATIONS

Mears, J.C. Jr, "High-speed error correcting encoder/decoder," IBM Technical Disclosure Bulletin USA, vol. 23, No. 4, Oct. 1980, pp. 2135-2136.
(Continued)

*Primary Examiner* — Edgar X Guerra-Erazo
(74) *Attorney, Agent, or Firm* — Fish & Richardson P.C.

(57) ABSTRACT

Non-voice data is embedded in a voice bit stream that includes frames of voice bits by selecting a frame of voice bits to carry the non-voice data, placing non-voice identifier bits in a first portion of the voice bits in the selected frame, and placing the non-voice data in a second portion of the voice bits in the selected frame. The non-voice identifier bits are employed to reduce a perceived effect of the non-voice data on audible speech produced from the voice bit stream.

15 Claims, 17 Drawing Sheets

(51) Int. Cl.
*G10L 19/005* (2013.01)
*G10L 19/02* (2013.01)
*G10L 25/18* (2013.01)

(58) Field of Classification Search
CPC ..... G10L 21/0364; G10L 25/15; G10L 25/21; G10L 25/75; G10L 25/60; G10L 25/63; G10L 25/69; G10L 25/72; G10L 25/78; G10L 2025/783; G10L 2025/786; G10L 25/81; G10L 25/84; G10L 25/87; G10L 2025/906
See application file for complete search history.

(56) References Cited

U.S. PATENT DOCUMENTS

| | | |
|---|---|---|
| 4,847,905 A | 7/1989 | Lefevre et al. |
| 4,932,061 A | 6/1990 | Kroon et al. |
| 4,944,013 A | 7/1990 | Gouvianakis et al. |
| 5,081,681 A | 1/1992 | Hardwick et al. |
| 5,086,475 A | 2/1992 | Kutaragi et al. |
| 5,193,140 A | 3/1993 | Minde |
| 5,195,166 A | 3/1993 | Hardwick et al. |
| 5,216,747 A | 6/1993 | Hardwick et al. |
| 5,226,084 A | 7/1993 | Hardwick et al. |
| 5,226,108 A | 7/1993 | Hardwick et al. |
| 5,247,579 A | 9/1993 | Hardwick et al. |
| 5,351,338 A | 9/1994 | Wigren et al. |
| 5,491,772 A | 2/1996 | Hardwick et al. |
| 5,517,511 A | 5/1996 | Hardwick et al. |
| 5,581,656 A | 12/1996 | Hardwick et al. |
| 5,630,011 A | 5/1997 | Lim et al. |
| 5,649,050 A | 7/1997 | Hardwick et al. |
| 5,657,168 A | 8/1997 | Maruyama et al. |
| 5,664,051 A | 9/1997 | Hardwick et al. |
| 5,664,052 A | 9/1997 | Nishiguchi et al. |
| 5,696,874 A | 12/1997 | Taguchi |
| 5,701,390 A | 12/1997 | Griffin et al. |
| 5,715,365 A | 2/1998 | Griffin et al. |
| 5,742,930 A | 4/1998 | Howitt |
| 5,754,974 A | 5/1998 | Griffin et al. |
| 5,826,222 A | 10/1998 | Griffin |
| 5,870,405 A | 2/1999 | Hardwick |
| 5,937,376 A | 8/1999 | Minde |
| 5,963,896 A | 10/1999 | Ozawa |
| 6,018,706 A | 1/2000 | Huang et al. |
| 6,064,955 A | 5/2000 | Huang et al. |
| 6,131,084 A | 10/2000 | Hardwick |
| 6,161,089 A | 12/2000 | Hardwick |
| 6,199,037 B1 | 3/2001 | Hardwick |
| 6,377,916 B1 | 4/2002 | Hardwick |
| 6,484,139 B2 | 11/2002 | Yajima |
| 6,502,069 B1 | 12/2002 | Grill et al. |
| 6,526,376 B1 | 2/2003 | Villette et al. |
| 6,574,593 B1 | 6/2003 | Gao et al. |
| 6,675,148 B2 | 1/2004 | Hardwick |
| 6,895,373 B2 | 5/2005 | Garcia et al. |
| 6,912,495 B2 | 6/2005 | Griffin et al. |
| 6,931,373 B1 | 8/2005 | Bhaskar et al. |
| 6,954,726 B2 | 10/2005 | Brandel et al. |
| 6,963,833 B1 | 11/2005 | Singhal |
| 7,016,831 B2 | 3/2006 | Suzuki et al. |
| 7,171,156 B2 | 1/2007 | Caffrey et al. |
| 7,289,952 B2 | 10/2007 | Yasunaga et al. |
| 7,310,596 B2 | 12/2007 | Ota et al. |
| 7,394,833 B2 | 7/2008 | Heikkinen et al. |
| 7,421,388 B2 | 9/2008 | Zinser et al. |
| 7,430,507 B2 | 9/2008 | Zinser et al. |
| 7,519,530 B2 | 4/2009 | Kaajas et al. |
| 7,529,660 B2 | 5/2009 | Bessette et al. |
| 7,529,662 B2 | 5/2009 | Zinser et al. |
| 7,634,399 B2 | 12/2009 | Hardwick |
| 7,957,963 B2 | 6/2011 | Hardwick |
| 7,970,606 B2 * | 6/2011 | Hardwick ............. G10L 19/087 704/208 |
| 8,200,497 B2 | 6/2012 | Hardwick |
| 8,315,860 B2 | 11/2012 | Hardwick |
| 8,340,973 B2 | 12/2012 | Tsuchinaga et al. |
| 8,359,197 B2 | 1/2013 | Hardwick |
| 8,595,002 B2 | 11/2013 | Hardwick |
| 9,232,376 B2 | 1/2016 | Senese et al. |
| 2003/0135374 A1 | 7/2003 | Hardwick |
| 2004/0117178 A1 | 6/2004 | Ozawa |
| 2004/0253925 A1* | 12/2004 | Caffrey ................. H04L 1/0045 455/66.1 |
| 2005/0281289 A1* | 12/2005 | Huang ............... H04N 21/4348 715/723 |
| 2017/0325049 A1 | 11/2017 | Basu Mallick et al. |
| 2021/0210106 A1 | 7/2021 | Clark |

FOREIGN PATENT DOCUMENTS

| | | |
|---|---|---|
| EP | 1237284 A1 | 9/2002 |
| JP | 05346797 A | 12/1993 |
| JP | 10293600 A | 11/1998 |
| WO | 1998004046 A2 | 1/1998 |
| WO | 2007/042350 A2 | 4/2007 |

OTHER PUBLICATIONS

Shoham. "High-quality speech coding at 2.4 to 4.0 kbit/s based on time-frequency Interpolation," 1993 IEEE International Conference on Acoustics, Speech, and Signal Processing. vol. 2. IEEE, 1993. Apr. 30, 1993 (Apr. 30, 1993) Retrieved on Mar. 9, 2021 (Mar. 9, 2021) from <https://ieeexplorejeee.org/abstract/document/319260> entire document.

International Searching Authority, Patent Cooperation Treaty, Notification of Transmittal of the International Search Report and the Written Opinion of the International Searching Authority, or the Declation, dated Nov. 18, 2022, 11 pages.

* cited by examiner

Structure of Bit Vector $\hat{u}_0$      Length = 12 bits

| Bit Position | 11 | 10 | 9 | 8 | 7 | 6 | 5 | 4 | 3 | 2 | 1 | 0 |
|---|---|---|---|---|---|---|---|---|---|---|---|---|
| Value | $\hat{b}_0(7)$ | $\hat{b}_0(6)$ | $\hat{b}_0(5)$ | $\hat{b}_0(4)$ | $\hat{b}_0(3)$ | $\hat{b}_0(2)$ | $\hat{b}_2(5)$ | $\hat{b}_2(4)$ | $\hat{b}_2(3)$ | $\hat{b}_3(5)$ | $\hat{b}_4(5)$ | $\hat{b}_5(5)$ |

Structure of Bit Vector $\hat{u}_1$      Length = 12 bits

| Bit Position | 11 | 10 | 9 | 8 | 7 | 6 | 5 | 4 | 3 | 2 | 1 | 0 |
|---|---|---|---|---|---|---|---|---|---|---|---|---|
| Value | $\hat{b}_8(5)$ | $\hat{b}_9(5)$ | $\hat{b}_3(4)$ | $\hat{b}_4(4)$ | $\hat{b}_5(4)$ | $\hat{b}_6(4)$ | $\hat{b}_7(4)$ | $\hat{b}_8(4)$ | $\hat{b}_9(4)$ | $\hat{b}_{10}(4)$ | $\hat{b}_3(3)$ | $\hat{b}_4(3)$ |

Structure of Bit Vector $\hat{u}_2$      Length = 12 bits

| Bit Position | 11 | 10 | 9 | 8 | 7 | 6 | 5 | 4 | 3 | 2 | 1 | 0 |
|---|---|---|---|---|---|---|---|---|---|---|---|---|
| Value | $\hat{b}_5(3)$ | $\hat{b}_6(3)$ | $\hat{b}_7(3)$ | $\hat{b}_8(3)$ | $\hat{b}_9(3)$ | $\hat{b}_{10}(3)$ | $\hat{b}_{11}(3)$ | $\hat{b}_{12}(3)$ | $\hat{b}_3(2)$ | $\hat{b}_4(2)$ | $\hat{b}_5(2)$ | $\hat{b}_6(2)$ |

Structure of Bit Vector $\hat{u}_3$      Length = 12 bits

| Bit Position | 11 | 10 | 9 | 8 | 7 | 6 | 5 | 4 | 3 | 2 | 1 | 0 |
|---|---|---|---|---|---|---|---|---|---|---|---|---|
| Value | $\hat{b}_7(2)$ | $\hat{b}_8(2)$ | $\hat{b}_9(2)$ | $\hat{b}_{10}(2)$ | $\hat{b}_{11}(2)$ | $\hat{b}_{12}(2)$ | $\hat{b}_{13}(2)$ | $\hat{b}_{14}(2)$ | $\hat{b}_{15}(2)$ | $\hat{b}_{16}(2)$ | $\hat{b}_3(1)$ | $\hat{b}_4(1)$ |

Structure of Bit Vector $\hat{u}_4$      Length = 11 bits

| Bit Position | 10 | 9 | 8 | 7 | 6 | 5 | 4 | 3 | 2 | 1 | 0 |
|---|---|---|---|---|---|---|---|---|---|---|---|
| Value | $\hat{b}_1(5)$ | $\hat{b}_1(4)$ | $\hat{b}_1(3)$ | $\hat{b}_1(2)$ | $\hat{b}_1(1)$ | $\hat{b}_1(0)$ | $\hat{b}_2(2)$ | $\hat{b}_2(1)$ | $\hat{b}_5(1)$ | $\hat{b}_6(1)$ | $\hat{b}_7(1)$ |

Structure of Bit Vector $\hat{u}_5$      Length = 11 bits

| Bit Position | 10 | 9 | 8 | 7 | 6 | 5 | 4 | 3 | 2 | 1 | 0 |
|---|---|---|---|---|---|---|---|---|---|---|---|
| Value | $\hat{b}_8(1)$ | $\hat{b}_9(1)$ | $\hat{b}_{10}(1)$ | $\hat{b}_{11}(1)$ | $\hat{b}_{12}(1)$ | $\hat{b}_{13}(1)$ | $\hat{b}_{14}(1)$ | $\hat{b}_{15}(1)$ | $\hat{b}_{16}(1)$ | $\hat{b}_{17}(1)$ | $\hat{b}_3(0)$ |

Structure of Bit Vector $\hat{u}_6$      Length = 11 bits

| Bit Position | 10 | 9 | 8 | 7 | 6 | 5 | 4 | 3 | 2 | 1 | 0 |
|---|---|---|---|---|---|---|---|---|---|---|---|
| Value | $\hat{b}_4(0)$ | $\hat{b}_5(0)$ | $\hat{b}_6(0)$ | $\hat{b}_7(0)$ | $\hat{b}_8(0)$ | $\hat{b}_9(0)$ | $\hat{b}_{10}(0)$ | $\hat{b}_{11}(0)$ | $\hat{b}_{12}(0)$ | $\hat{b}_{13}(0)$ | $\hat{b}_{14}(0)$ |

Structure of Bit Vector $\hat{u}_7$      Length = 7 bits

| Bit Position | 6 | 5 | 4 | 3 | 2 | 1 | 0 |
|---|---|---|---|---|---|---|---|
| Value | $\hat{b}_{15}(0)$ | $\hat{b}_{16}(1)$ | $\hat{b}_{17}(0)$ | $\hat{b}_2(0)$ | $\hat{b}_0(1)$ | $\hat{b}_0(0)$ | $\hat{b}_{16}(0)$ |

Full Rate Voice Data Packet Example – Output Structure

FIG. 3B

Structure of Bit Vector $\hat{u}_0$     Length = 12 bits

| Bit Position | 11 | 10 | 9 | 8 | 7 | 6 | 5 | 4 | 3 | 2 | 1 | 0 |
|---|---|---|---|---|---|---|---|---|---|---|---|---|
| Value | $\hat{b}_0(6)$ | $\hat{b}_0(5)$ | $\hat{b}_0(4)$ | $\hat{b}_0(3)$ | $\hat{b}_1(4)$ | $\hat{b}_1(3)$ | $\hat{b}_1(2)$ | $\hat{b}_1(1)$ | $\hat{b}_2(4)$ | $\hat{b}_2(3)$ | $\hat{b}_2(2)$ | $\hat{b}_2(1)$ |

Structure of Bit Vector $\hat{u}_1$     Length = 12 bits

| Bit Position | 11 | 10 | 9 | 8 | 7 | 6 | 5 | 4 | 3 | 2 | 1 | 0 |
|---|---|---|---|---|---|---|---|---|---|---|---|---|
| Value | $\hat{b}_3(8)$ | $\hat{b}_3(7)$ | $\hat{b}_3(6)$ | $\hat{b}_3(5)$ | $\hat{b}_3(4)$ | $\hat{b}_3(3)$ | $\hat{b}_3(2)$ | $\hat{b}_3(1)$ | $\hat{b}_4(6)$ | $\hat{b}_4(5)$ | $\hat{b}_4(4)$ | $\hat{b}_4(3)$ |

Structure of Bit Vector $\hat{u}_2$     Length = 11 bits

| Bit Position | 10 | 9 | 8 | 7 | 6 | 5 | 4 | 3 | 2 | 1 | 0 |
|---|---|---|---|---|---|---|---|---|---|---|---|
| Value | $\hat{b}_5(4)$ | $\hat{b}_5(3)$ | $\hat{b}_5(2)$ | $\hat{b}_5(1)$ | $\hat{b}_6(3)$ | $\hat{b}_6(2)$ | $\hat{b}_6(1)$ | $\hat{b}_7(3)$ | $\hat{b}_7(2)$ | $\hat{b}_7(1)$ | $\hat{b}_8(2)$ |

Structure of Bit Vector $\hat{u}_3$     Length = 14 bits

| Bit Position | 13 | 12 | 11 | 10 | 9 | 8 | 7 | 6 | 5 | 4 | 3 | 2 | 1 | 0 |
|---|---|---|---|---|---|---|---|---|---|---|---|---|---|---|
| Value | $\hat{b}_1(0)$ | $\hat{b}_2(0)$ | $\hat{b}_0(2)$ | $\hat{b}_0(1)$ | $\hat{b}_0(0)$ | $\hat{b}_3(0)$ | $\hat{b}_4(2)$ | $\hat{b}_4(1)$ | $\hat{b}_4(0)$ | $\hat{b}_5(0)$ | $\hat{b}_6(0)$ | $\hat{b}_7(0)$ | $\hat{b}_8(1)$ | $\hat{b}_8(0)$ |

Half Rate Voice Data Packet – Output Structure

FIG. 4B

Packet ID

| 6 bits | Description | Value |
|---|---|---|
| I5 I4 I3 I2 I1 I0 | Full-Rate Variant 1 data packet identifier | 0x3C |

Packet Type

| 3 bits | Description | Value |
|---|---|---|
| T2 T1 T0 | Indicates the type of data contained in the data packet | TBD |

Reserved

| 3 bits | Description | Value |
|---|---|---|
| R2 R1 R0 | These bits are reserved for future use | TBD |

Data Message

| 48 bits | Description | Value |
|---|---|---|
| M47 M46 M45 ..... M2 M1 M0 | Non voice data | Various |

Full-Rate Variant 1 Data Packet Components

FIG. 8A

Structure of Bit Vector $\hat{u}_0$ — Length = 12 bits

| Bit Position | 11 | 10 | 9 | 8 | 7 | 6 | 5 | 4 | 3 | 2 | 1 | 0 |
|---|---|---|---|---|---|---|---|---|---|---|---|---|
| Value | $I_5$ | $I_4$ | $I_3$ | $I_2$ | $I_1$ | $I_0$ | $T_2$ | $T_1$ | $T_0$ | $R_2$ | $R_1$ | $R_0$ |

Structure of Bit Vector $\hat{u}_1$ — Length = 12 bits

| Bit Position | 11 | 10 | 9 | 8 | 7 | 6 | 5 | 4 | 3 | 2 | 1 | 0 |
|---|---|---|---|---|---|---|---|---|---|---|---|---|
| Value | $M_{47}$ | $M_{46}$ | $M_{45}$ | $M_{44}$ | $M_{43}$ | $M_{42}$ | $M_{41}$ | $M_{40}$ | $M_{39}$ | $M_{38}$ | $M_{37}$ | $M_{36}$ |

Structure of Bit Vector $\hat{u}_2$ — Length = 12 bits

| Bit Position | 11 | 10 | 9 | 8 | 7 | 6 | 5 | 4 | 3 | 2 | 1 | 0 |
|---|---|---|---|---|---|---|---|---|---|---|---|---|
| Value | $M_{35}$ | $M_{34}$ | $M_{33}$ | $M_{32}$ | $M_{31}$ | $M_{30}$ | $M_{29}$ | $M_{28}$ | $M_{27}$ | $M_{26}$ | $M_{25}$ | $M_{24}$ |

Structure of Bit Vector $\hat{u}_3$ — Length = 12 bits

| Bit Position | 11 | 10 | 9 | 8 | 7 | 6 | 5 | 4 | 3 | 2 | 1 | 0 |
|---|---|---|---|---|---|---|---|---|---|---|---|---|
| Value | $M_{23}$ | $M_{22}$ | $M_{21}$ | $M_{20}$ | $M_{19}$ | $M_{18}$ | $M_{17}$ | $M_{16}$ | $M_{15}$ | $M_{14}$ | $M_{13}$ | $M_{12}$ |

Structure of Bit Vector $\hat{u}_4$ — Length = 11 bits

| Bit Position | 10 | 9 | 8 | 7 | 6 | 5 | 4 | 3 | 2 | 1 | 0 |
|---|---|---|---|---|---|---|---|---|---|---|---|
| Value | $M_{11}$ | $M_{10}$ | $M_9$ | $M_8$ | $M_7$ | $M_6$ | $M_5$ | $M_4$ | $M_3$ | $M_2$ | $M_1$ |

Structure of Bit Vector $\hat{u}_5$ — Length = 11 bits

| Bit Position | 10 | 9 | 8 | 7 | 6 | 5 | 4 | 3 | 2 | 1 | 0 |
|---|---|---|---|---|---|---|---|---|---|---|---|
| Value | $M_{11}$ | $M_{10}$ | $M_9$ | $M_8$ | $M_7$ | $M_6$ | $M_5$ | $M_4$ | $M_3$ | $M_2$ | $M_1$ |

Structure of Bit Vector $\hat{u}_6$ — Length = 11 bits

| Bit Position | 10 | 9 | 8 | 7 | 6 | 5 | 4 | 3 | 2 | 1 | 0 |
|---|---|---|---|---|---|---|---|---|---|---|---|
| Value | $M_{11}$ | $M_{10}$ | $M_9$ | $M_8$ | $M_7$ | $M_6$ | $M_5$ | $M_4$ | $M_3$ | $M_2$ | $M_1$ |

Structure of Bit Vector $\hat{u}_7$ — Length = 7 bits

| Bit Position | 6 | 5 | 4 | 3 | 2 | 1 | 0 |
|---|---|---|---|---|---|---|---|
| Value | $M_0$ | $M_0$ | $M_0$ | $spare_3$ | $spare_2$ | $spare_1$ | $spare_0$ |

Full-Rate Variant 1 Data Packet Output Structure

| 11 bits | Description | Value |
|---|---|---|
| I10 I9 I8 I7 I6 I5 I4 I3 I2 I1 I0 | Full-Rate Variant 2 Data Packet identifier | 0x000 |

Type

| 3 bits | Description | Value |
|---|---|---|
| T2 T1 T0 | Indicates the type of data contained in the packet | TBD |

Reserved

| 1 Bit | Description | Value |
|---|---|---|
| R0 | This bit is reserved for future use | TBD |

Data Message

| 48 bits | Description | Value |
|---|---|---|
| M47 M46 M45 ..... M2 M1 M0 | Non voice data | Various |

Full Rate Variant 2 Data Packet Components

FIG. 9A

Structure of Bit Vector $\hat{u}_0$ — Length = 12 bits

| Bit Position | 11 | 10 | 9 | 8 | 7 | 6 | 5 | 4 | 3 | 2 | 1 | 0 |
|---|---|---|---|---|---|---|---|---|---|---|---|---|
| Value | $I_{10}$ | $I_9$ | $I_8$ | $I_7$ | $I_6$ | $T_2$ | $I_5$ | $I_4$ | $I_3$ | $R_0$ | $T_1$ | $T_0$ |

Structure of Bit Vector $\hat{u}_1$ — Length = 12 bits

| Bit Position | 11 | 10 | 9 | 8 | 7 | 6 | 5 | 4 | 3 | 2 | 1 | 0 |
|---|---|---|---|---|---|---|---|---|---|---|---|---|
| Value | $M_{47}$ | $M_{46}$ | $M_{45}$ | $M_{44}$ | $M_{43}$ | $M_{42}$ | $M_{41}$ | $M_{40}$ | $M_{39}$ | $M_{38}$ | $M_{37}$ | $M_{36}$ |

Structure of Bit Vector $\hat{u}_2$ — Length = 12 bits

| Bit Position | 11 | 10 | 9 | 8 | 7 | 6 | 5 | 4 | 3 | 2 | 1 | 0 |
|---|---|---|---|---|---|---|---|---|---|---|---|---|
| Value | $M_{35}$ | $M_{34}$ | $M_{33}$ | $M_{32}$ | $M_{31}$ | $M_{30}$ | $M_{29}$ | $M_{28}$ | $M_{27}$ | $M_{26}$ | $M_{25}$ | $M_{24}$ |

Structure of Bit Vector $\hat{u}_3$ — Length = 12 bits

| Bit Position | 11 | 10 | 9 | 8 | 7 | 6 | 5 | 4 | 3 | 2 | 1 | 0 |
|---|---|---|---|---|---|---|---|---|---|---|---|---|
| Value | $M_{23}$ | $M_{22}$ | $M_{21}$ | $M_{20}$ | $M_{19}$ | $M_{18}$ | $M_{17}$ | $M_{16}$ | $M_{15}$ | $M_{14}$ | $M_{13}$ | $M_{12}$ |

Structure of Bit Vector $\hat{u}_4$ if $T_2 = 0$ — Length = 11 bits

| Bit Position | 10 | 9 | 8 | 7 | 6 | 5 | 4 | 3 | 2 | 1 | 0 |
|---|---|---|---|---|---|---|---|---|---|---|---|
| Value | $M_{11}$ | $M_{10}$ | $M_9$ | $I_2$ | $I_1$ | $M_6$ | $M_5$ | $M_4$ | $M_3$ | $M_2$ | $M_1$ |

Structure of Bit Vector $\hat{u}_4$ if $T_2 = 1$ — Length = 11 bits

| Bit Position | 10 | 9 | 8 | 7 | 6 | 5 | 4 | 3 | 2 | 1 | 0 |
|---|---|---|---|---|---|---|---|---|---|---|---|
| Value | $M_{11}$ | $M_{10}$ | $M_9$ | $M_8$ | $I_2$ | $I_1$ | $M_5$ | $M_4$ | $M_3$ | $M_2$ | $M_1$ |

Structure of Bit Vector $\hat{u}_5$ — Length = 11 bits

| Bit Position | 10 | 9 | 8 | 7 | 6 | 5 | 4 | 3 | 2 | 1 | 0 |
|---|---|---|---|---|---|---|---|---|---|---|---|
| Value | $M_{11}$ | $M_{10}$ | $M_9$ | $M_8$ | $M_7$ | $M_6$ | $M_5$ | $M_4$ | $M_3$ | $M_2$ | $M_1$ |

Structure of Bit Vector $\hat{u}_6$ — Length = 11 bits

| Bit Position | 10 | 9 | 8 | 7 | 6 | 5 | 4 | 3 | 2 | 1 | 0 |
|---|---|---|---|---|---|---|---|---|---|---|---|
| Value | $M_{11}$ | $M_{10}$ | $M_9$ | $M_8$ | $M_7$ | $M_6$ | $M_5$ | $M_4$ | $M_3$ | $M_2$ | $M_1$ |

Structure of Bit Vector $\hat{u}_7$ If $T_2 = 0$ — Length = 7 bits

| Bit Position | 6 | 5 | 4 | 3 | 2 | 1 | 0 |
|---|---|---|---|---|---|---|---|
| Value | $M_0$ | $M_0$ | $M_0$ | $I_0$ | $M_8$ | $M_7$ | sync_reserved |

Structure of Bit Vector $\hat{u}_7$ If $T_2 = 1$ — Length = 7 bits

| Bit Position | 6 | 5 | 4 | 3 | 2 | 1 | 0 |
|---|---|---|---|---|---|---|---|
| Value | $M_0$ | $M_0$ | $M_0$ | $I_0$ | $M_7$ | $M_6$ | sync_reserved |

Full-Rate Variant 2 Data Packet Output Structure

| 7 bits | Description | Value |
|---|---|---|
| I6 I5 I4 I3 I2 I1 I0 | Half-Rate Variant 3 Data Packet identifier | 0x78 |

Type

| 4 bits | Description | Value |
|---|---|---|
| T3 T2 T1 T0 | Indicates the type of data contained in the packet | TBD |

Reserved

| 2 bits | Description | Value |
|---|---|---|
| R1 R0 | These bits are reserved for future use | TBD |

Data Message

| 24 bits | Description | Value |
|---|---|---|
| M23 M22 M21 ..... M2 M1 M0 | Non voice data | Various |

Parity Check

| 12 bits | Description | Value |
|---|---|---|
| P11 P10 P9 ..... P2 P1 P0 | Non voice data | Various |

Half-Rate Variant 3 Data Packet Components

FIG. 10A

Structure of Bit Vector û0 — length = 12 bits

| Bit Position | 11 | 10 | 9 | 8 | 7 | 6 | 5 | 4 | 3 | 2 | 1 | 0 |
|---|---|---|---|---|---|---|---|---|---|---|---|---|
| Value | I6 | I5 | I4 | I3 | I2 | I1 | T3 | T2 | T1 | T0 | R1 | R0 |

Structure of Bit Vector û1 — length = 12 bits

| Bit Position | 11 | 10 | 9 | 8 | 7 | 6 | 5 | 4 | 3 | 2 | 1 | 0 |
|---|---|---|---|---|---|---|---|---|---|---|---|---|
| Value | M23 | M22 | M21 | M20 | M19 | M18 | M17 | M16 | M15 | M14 | M13 | M12 |

Structure of Bit Vector û2 — length = 11 bits

| Bit Position | 10 | 9 | 8 | 7 | 6 | 5 | 4 | 3 | 2 | 1 | 0 |
|---|---|---|---|---|---|---|---|---|---|---|---|
| Value | M11 | M10 | M9 | M8 | M7 | M6 | M5 | M4 | M3 | M2 | M1 |

Structure of Bit Vector û3 — length = 14 bits

| Bit Position | 13 | 12 | 11 | 10 | 9 | 8 | 7 | 6 | 5 | 4 | 3 | 2 | 1 | 0 |
|---|---|---|---|---|---|---|---|---|---|---|---|---|---|---|
| Value | M0 | I0 | P11 | P10 | P9 | P8 | P7 | P6 | P5 | P4 | P3 | P2 | P1 | P0 |

FIG. 10B: Half-Rate Variant 3 Data Packet Output Structure

ID

| | Description | Value |
|---|---|---|
| 9 bits | Half-Rate Variant 4 Data Packet identifier | 0x000 |
| I8 I7 I6 I5 I4 I3 I2 I1 I0 | | |

Type

| | Description | Value |
|---|---|---|
| 4 bits | Indicates the type of data contained in the packet | TBD |
| T3 T2 T1 T0 | | |

Data Message

| | Description | Value |
|---|---|---|
| 24 bits | Non voice data | Various |
| M23 M22 M21 ..... M2 M1 M0 | | |

Parity Check

| | Description | Value |
|---|---|---|
| 12 bits | Non voice data | Various |
| P11 P10 P9 ..... P2 P1 P0 | | |

Half-Rate Variant 4 Data Packet Components

FIG. 11A

Structure of Bit Vector û0                                                                                                                length = 12 bits

| Bit Position | 11 | 10 | 9  | 8  | 7  | 6  | 5  | 4  | 3  | 2  | 1  | 0  |
|---|---|---|---|---|---|---|---|---|---|---|---|---|
| Value | I8 | I7 | I6 | I5 | T3 | T2 | T1 | T0 | I4 | I3 | I2 | I1 |

Structure of Bit Vector û1                                                                                                                length = 12 bits

| Bit Position | 11 | 10 | 9 | 8 | 7 | 6 | 5 | 4 | 3 | 2 | 1 | 0 |
|---|---|---|---|---|---|---|---|---|---|---|---|---|
| Value | M23 | M22 | M21 | M20 | M19 | M18 | M17 | M16 | M15 | M14 | M13 | M12 |

Structure of Bit Vector û2                                                                                                                length = 11 bits

| Bit Position | 10 | 9 | 8 | 7 | 6 | 5 | 4 | 3 | 2 | 1 | 0 |
|---|---|---|---|---|---|---|---|---|---|---|---|
| Value | M11 | M10 | M9 | M8 | M7 | M6 | M5 | M4 | M3 | M2 | M1 |

Structure of Bit Vector û3                                                                                                                length = 14 bits

| Bit Position | 13 | 12 | 11 | 10 | 9 | 8 | 7 | 6 | 5 | 4 | 3 | 2 | 1 | 0 |
|---|---|---|---|---|---|---|---|---|---|---|---|---|---|---|
| Value | M0 | I0 | P11 | P10 | P9 | P8 | P7 | P6 | P5 | P4 | P3 | P2 | P1 | P0 |

Half-Rate Variant 4 Data Packet Output Structure

FIG. 11B

REDUCING PERCEIVED EFFECTS OF NON-VOICE DATA IN DIGITAL SPEECH

TECHNICAL FIELD

This description relates generally to processing of digital speech.

BACKGROUND

Modern voice communications such as mobile radio and cellular telephony transmit voice as digital data, and in many cases where transmission bandwidth is limited, the voice data is compressed by a vocoder to reduce the data that must be transmitted. Similarly, voice recording and storage applications may also use digital voice data with a vocoder to reduce the amount of data that must be stored per unit time. In either case, the analog voice signal from a microphone is converted into a digital waveform using an Analog-to-Digital converter to produce a sequence of voice samples. In traditional telephony applications, speech is limited to 3-4 kHz of bandwidth and a sample rate of 8 kHz is used. In higher bandwidth applications, a corresponding higher sampling rate (such as 16 kHz or 32 kHz) may be used. The digital voice signal (i.e., the sequence of voice samples) is processed by the vocoder to reduce the overall amount of voice data. For example, a voice signal that is sampled at 8 kHz with 16 bits per sample results in a total voice data rate of 8,000×16=128,000 bits per second (bps), and a vocoder can be used to reduce the bit rate of this voice signal to rates of 2,000-8,000 bps (i.e., where 2,000 bps is a compression ratio of 64 and 8000 bps is a compression rate of 16) being achievable while still maintaining reasonable voice quality and intelligibility. Such large compression ratios are due to the large amount of redundancy within the voice signal and the inability of the ear to discern certain types of distortion. The result is that the vocoder forms a vital part of most modern voice communications systems where the reduction in data rate conserves precious RF spectrum and provides economic benefits to both service providers and users.

Vocoders are employed by digital mobile radio systems including P25, dPMR, DMR, and TETRA, where a low bit rate vocoder, typically operating between 2-5 kbps, is used. For example, in P25 radio systems, a dual-rate vocoder operating at 2450 or 4400 bps (not including error control bits) is used, while in DMR the vocoder operates at 2450 bps. In these and other radio systems, the vocoder is based on the Multiband Excitation (MBE) speech model and variants include the IMBE, AMBE and AMBE+2 vocoders. TIA standard document 102BABA including the Half Rate Vocoder Annex describes a dual rate vocoder used in P25. While newer versions of this vocoder containing various additional features and enhancements have been developed and are in use in newer radio equipment, the IMBE vocoder described in TIA 102BABA is illustrative of the type of vocoder used in the systems described below. Other details of MBE vocoders are discussed in U.S. Pat. No. 7,970,606 ("Interoperable Vocoder") and U.S. Pat. No. 8,359,197 ("Half-rate Vocoder"), both of which are incorporated by reference.

That vocoder is divided into two primary functions: (i) an encoder that converts an input sequence of voice samples into a low-rate voice bit stream; and (ii) a decoder that reverses the encoding process and converts the low-rate voice bit stream back into a sequence of voice samples that are suitable for playback via a digital-to-analog converter and a loudspeaker.

As digital mobile radio systems continue to grow and evolve, there is increasing need to support new features and functions that are beyond what is supported by the auxiliary data capability of the current systems. For example, public safety users have a need to send location and other data that was not provided for at the time the radio systems were designed and/or standardized. Furthermore, this data must be sent while voice communication is ongoing so simply switching off the voice data for location or other non-voice data is not an option. The need to provide this additional non-voice data is complicated by the large installed base of digital radio equipment already in the field that must continue to be supported—preferably with no change. Consequently, there is a critical need for ways to simultaneously send voice and non-voice data while remaining backward compatible with existing digital radio systems and equipment. Furthermore, this must be done while maintaining voice quality and intelligibility and without interfering with or degrading existing radio functions and features.

Prior approaches to sending non-voice data during voice communications have required coordination between the transmitter and receiver. To properly recover the non-voice data from the transmitted bit stream, the receiver had to know when the non-voice data would be transmitted. In one such method, as described in U.S. Pat. No. 9,232,376 B2, the transmitter and receiver first coordinate a schedule for sending the data across a radio air interface. This approach employs additional signaling bits to perform the coordination, typically in the form of new Link Control messages or via other signaling fields outside of the voice frames. In addition, this coordination requires both the encoder and decoder to be modified such that they each know in advance the specifics of the schedules, such as their predefined beginning and ending points, and the particular bits or fields that will be replaced with non-data. This method does not address the effect on the large number of existing legacy (i.e., unmodified) decoders that may receive a bit stream where voice frames have been replaced with non-voice data. Typically, a legacy decoder that receives such a bit stream will designate some fraction of these replaced voice frames as valid and these will then be used by the legacy decoder to produce an output voice signal. However, since these replaced voice frames do not actually contain valid voice bits, the result can produce large "squawks" or other distortion in the output voice signal that can be readily perceived by a listener.

SUMMARY

Techniques are provided for selectively embedding non-voice data into the low-rate voice bit stream in a P25, DMR, dPMR, NXDN or other digital mobile radio system. The techniques feature the ability to replace the majority of the bits within a voice frame while remaining backward compatible with existing receivers, and without significantly degrading voice quality or intelligibility. The techniques use the voice bit stream instead of other auxiliary data fields so that they do not interfere with or degrade existing radio functions and features.

In one general aspect, embedding non-voice data in a voice bit stream that includes frames of voice bits, includes selecting a frame of voice bits to carry the non-voice data; placing non-voice identifier bits in a first portion of the voice bits in the selected frame; and placing the non-voice data in a second portion of the voice bits in the selected frame. The non-voice identifier bits are employed to reduce a perceived effect of the non-voice data on audible speech produced from the voice bit stream.

Implementations may include one or more of the following features. For example, the first portion of voice bits in the selected frame may include voice bits used to represent the gain, level or amplitude of the frame, and the non-voice identifier bits may carry information corresponding to a low level voice signal. In particular, the frames of voice bits may represent MBE speech model parameters, and the first portion of voice bits in the selected frame may include voice bits used to represent the fundamental frequency or pitch period of the frame, and the non-voice identifier bits may carry information corresponding to a short pitch period. The second portion of the voice bits in the selected frame may include voice bits used to represent spectral magnitudes or V/UV decisions.

The non-voice data may include location or position data, such as longitude, latitude or altitude information.

Selecting the frame of voice bits to carry the non-voice data may include comparing speech parameters for the frame to speech parameters for a preceding frame to produce a measure of similarity between the speech parameters for the frame and the preceding frame, and selecting the frame of voice bits to carry the non-voice data when the measure of similarity satisfies a threshold condition. The measure of similarity may constitute a distance measure between the spectral magnitudes of the frame and the spectral magnitudes of the preceding frame. The threshold condition may change based on a time interval between the frame and an earlier frame selected to carry non-voice data.

The non-voice identifier bits carry information corresponding to an invalid voice frame. The speech parameters for the frame may include MBE speech model parameters, the first portion of voice bits in the selected frames may include voice bits used to represent the fundamental frequency or pitch period of the frame, and the second portion of the voice bits in the selected frame may include voice bits used to represent the spectral magnitudes or voicing decisions. Quantizer state information for the MBE speech model parameters is not updated during frames in which the non-voice identifier bits carry information corresponding to an invalid voice frame.

In another general aspect, embedding non-voice data into a voice bit stream includes selecting a frames of voice bits to carry the non-voice data; and replacing at least a portion of the voice bits in the selected frame with non-voice data. The replacement causes the selected frame to be identified as an invalid voice frame, and quantizer state information associated with the voice bit stream is not updated for the selected frame.

Implementations may include one or more the features noted above.

The techniques for embedding non-voice data discussed above may be implemented by a speech encoder. The speech encoder may be included in, for example, a handset, a mobile radio, a base station or a console.

In another general aspect, recovering non-voice data from a voice bit stream includes comparing voice bits in a first portion of a frame against one or more predetermined patterns of non-voice identifier bits, and recovering non-voice data from a second portion of the frame when one of the predetermined patterns of non-voice identifier bits is detected. The predetermined patterns of non-voice identifier bits reduce the perceived effect of the non-voice data on audible speech produced based on the voice bit stream.

Implementations may include one or more of the following features. For example, the first portion of voice bits in the selected frames include voice bits used to represent a gain, level or amplitude of the frame, and at least one of the predetermined patterns carry information corresponding to a voice signal with a low gain, level or amplitude. One or more frames containing non-voice data may be decoded to produce a voice signal with a low gain, level or amplitude, where a perceived effect of the non-voice data on audible speech produced using the voice signal is lowered by the low gain, level or amplitude of the voice signal.

The frames of voice bits may represent MBE speech model parameters, and the first portion of voice bits in the selected frames may include voice bits used to represent the fundamental frequency or pitch period of the frame and the second portion of the voice bits in the selected frames may include voice bits used to represent the spectral magnitudes and/or V/UV decisions. At least one of the predetermined patterns may carry information corresponding to an invalid voice frame, where the perceived effect of the non-voice data on the voice bit stream is reduced by repeating parameters decoded for a prior frame and not updating quantizer state information associated with the voice bit stream when an invalid voice frame is detected. The second portion of the voice bits in the selected frames may include voice bits used to represent the spectral magnitudes or voicing decisions.

The non-voice data may include additional error control bits used in the recovery of the non-voice data from the second portion of the frame.

In another general aspect, recovering non-voice data from a voice bit stream used to produce a sequence of voice parameters used to generate audible speech includes decoding a frame of bits to produce voice parameters using a voice decoding method that employs quantizer state information and determining validity of the frame from the voice parameters. Upon determining that the frame is invalid, non-voice data is recovered from the frame, voice parameters decoded from a prior frame are repeated in the sequence of voice parameters, and the quantizer state information for the frame is not updated.

Decoding the frame of bits may include using error control decoding, and determining the validity of the frame may include computing a measure of the number of bit errors in the frame and comparing a measure of the number of bit errors in the frame against a threshold.

Recovering non-voice data from the frame may include decoding the frame of bits using a non-voice decoding method that includes error control decoding that is different from the error control decoding included in the voice decoding method. For example, the voice decoding method may include error control decoding using Golay or Hamming codes, and the non-voice decoding method may include error control decoding using a convolutional code.

The non-voice decoding method includes error control decoding using an error detecting code such as a CRC or checksum.

The techniques for recovering non-voice data discussed above may be implemented by a speech decoder. The speech decoder may be included in, for example, a handset, a mobile radio, a base station or a console.

Other features will be apparent from the following description, including the drawings, and the claims.

DESCRIPTION OF DRAWINGS

FIGS. 3A and 3B are a frame structure (FIG. 3A) and data packet example (FIG. 3B) for an example of a full rate voice frame.

FIGS. 4A and 4B are a frame structure (FIG. 4A) and data packet example (FIG. 4B) for an example of a half rate voice frame.

FIGS. 8A-11B illustrate data packet structures.

DETAILED DESCRIPTION

Figure 1:
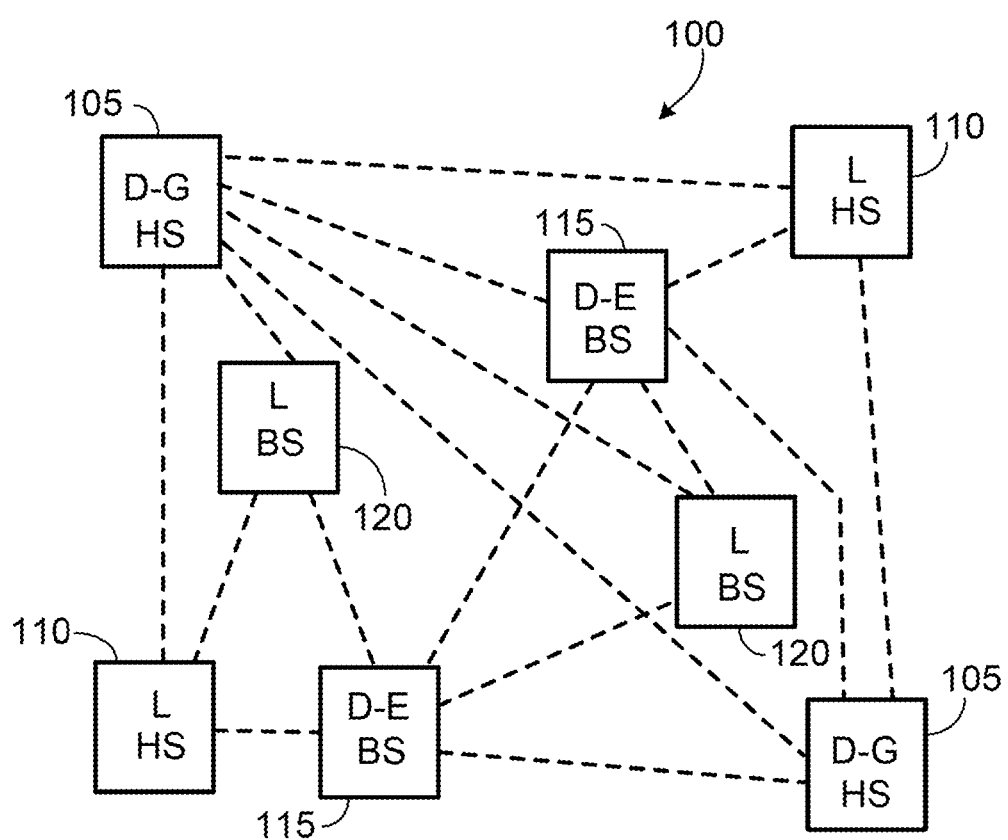
FIG. 1 is a block diagram of a radio communications system.

Referring to FIG. 1, a digital mobile radio communication system 100 includes data-enabled handsets 105, legacy handsets 110, data-enabled base stations 115, and legacy base stations 120, all of which can communicate voice data with one another through one or more radio voice channels. Upon receipt of voice data, the data-enabled handsets 105, the legacy handsets 110, the data-enabled base stations 115, and the legacy base stations 120 convert the voice data into audible speech produced by corresponding loudspeakers. In addition to transmitting voice data, the data-enabled handsets 105 and the data-enabled base stations 115 may transmit additional non-voice data by embedding the non-voice data into the voice data in a way that does not significantly degrade the voice quality or intelligibility of the audible speech produced by data-enabled handsets 105 and data-enabled base stations 115, or that of the audible speech produce by legacy handsets 110 and legacy base stations 120.

The techniques for selectively embedding non-voice data into a low-rate voice bit stream are implemented by a data-enabled vocoder that is divided into a data-enabled encoder which functions at the transmitting side of a communication system and a data-enabled decoder which functions at the receiving side of a communication system. Communications equipment such as a radio or telephone may include both the encoder and decoder functions with either or both operating simultaneously (i.e., a full-duplex device such as a telephone), or only one operating at a time depending on the direction of communication (i.e., a half-duplex device as a radio or walkie-talkie). References to a data-enabled encoder and decoder are meant to identify a new encoder and decoder that has the ability to send non-voice data as part of the voice bit stream, and is meant to distinguish them from the legacy (i.e., older) encoder and decoder used in existing equipment that do not have data capability as described herein.

For the purposes of this description, "non-voice" data is a generic label referring to any data originating outside the primary vocoder in the system. While GPS or other location information is referenced below as an example of the non-voice data, the techniques are not restricted to just this data. Indeed, non-voice data could be any type of data (including other voice data ancillary to the primary voice bit stream).

Figure 2:
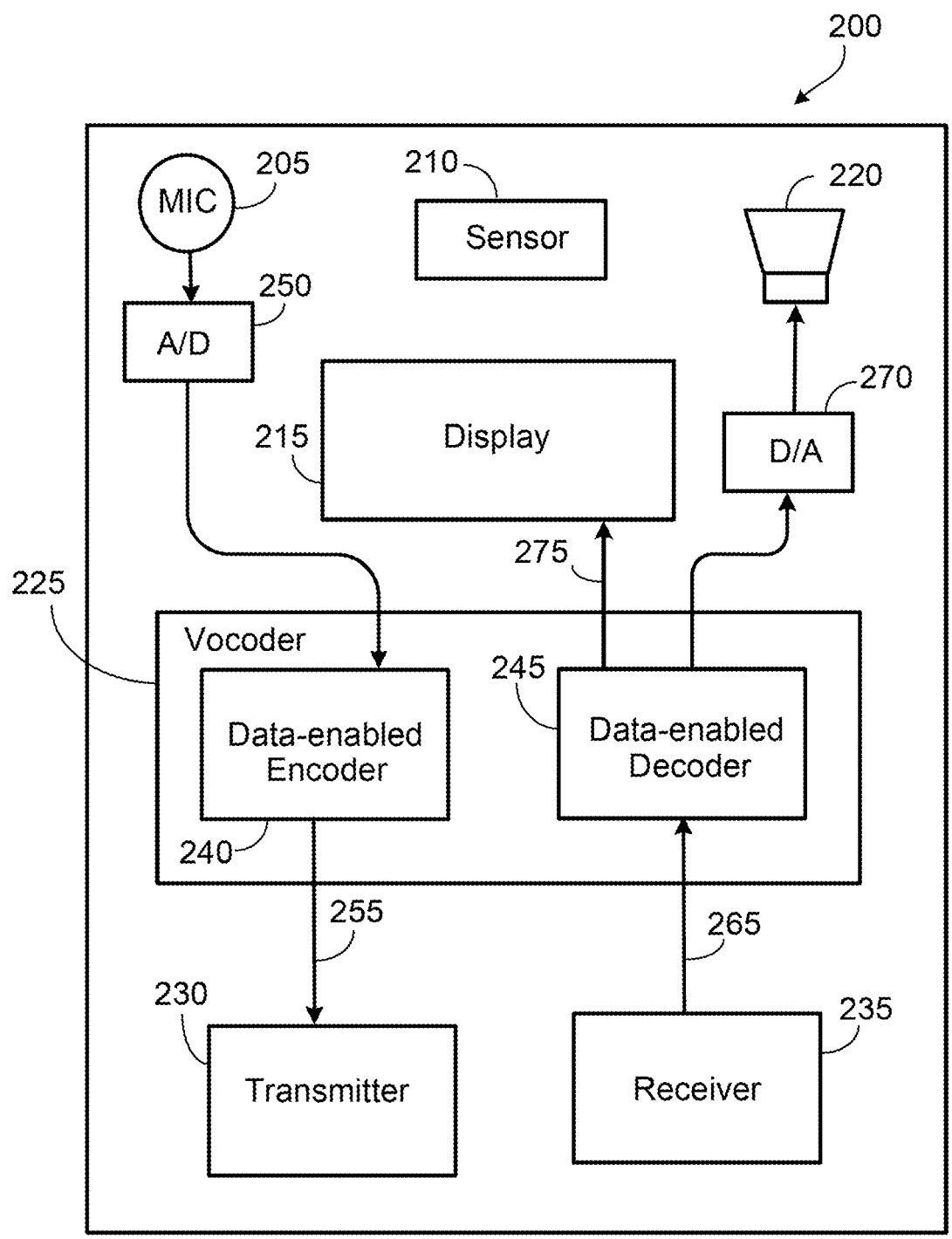
FIG. 2 is a block diagram of a data-enabled device.

Referring to FIG. 2, a data-enabled device 200 (such as a data-enabled handset 105 or a data-enabled base station 115) includes a microphone 205, one or more sensors 210, a display 215, a loudspeaker 220, a data-enabled vocoder 225, a transmitter 230, and a receiver 235. For example, the sensors 210 may include a GPS sensor that determines the location of the device 200, and the display 215 may display the location of the device 200 and the locations of other data-enabled devices. The data-enabled vocoder 225 includes a data-enabled encoder 240 that encodes speech received through the microphone 205 for transmission using the transmitter 230, and a data-enabled decoder 245 that decodes speech data received by the receiver 235. The data-enabled vocoder 225 may be a MBE vocoder.

In more detail, the device 200 samples analog speech from the microphone 205, and an analog-to-digital ("A-to-D") converter 250 digitizes the sampled speech to produce a digital speech signal. The encoder 240 processes the digital speech to produce a digital bit stream 255 suitable for transmission by the transmitter 230. The encoder 240 also receives non-voice data 260 from the one or more sensors 210 and incorporates that data into the digital bit stream 255 in a way that the voice quality or intelligibility of the audible speech produced from the digital bit stream 255 is not significantly degraded, regardless of whether the digital bit stream 255 is received by a data-enabled device or a legacy device that produces audible speech corresponding to the digital bit stream.

Similarly, the decoder 245 receives a bit stream 265 from the receiver 235 and processes the bit stream 265 to produce synthesized speech samples that a digital-to-analog ("D-to-A") converter 270 then converts to an analog signal that can be passed to the loudspeaker 220 for conversion into an acoustic signal suitable for human listening. When the bit stream 265 includes additional data added by a data-enabled device, the decoder 245 extracts the data and provides a data stream 275 for use by the device 200. For example, as noted above, the data stream 275 may include the location of the data-enabled device that sent the signal corresponding to the bit stream 265, and the device 200 may display that location on the display 215.

Figure 3A:
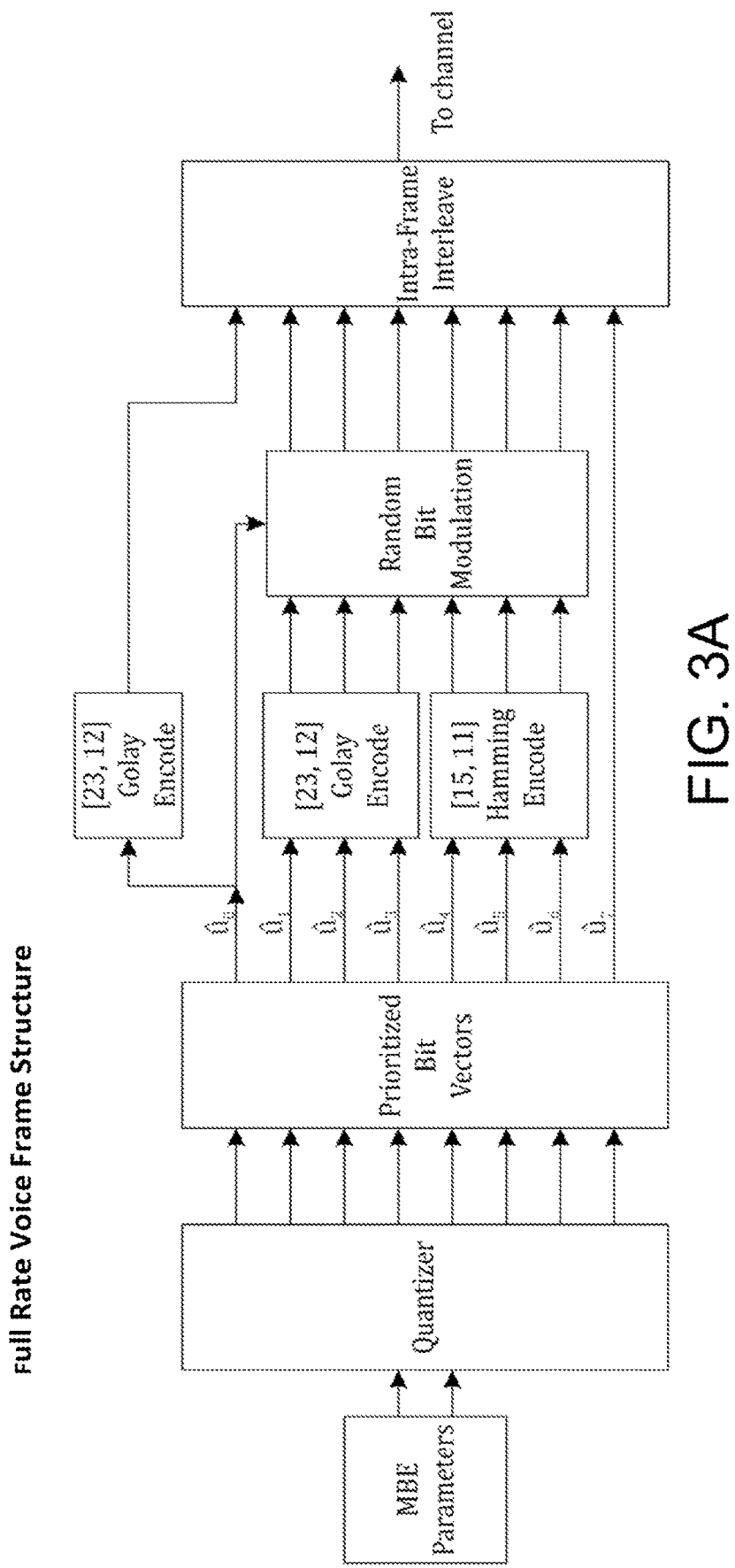

In a digital mobile radio application, such as that used by the system 100, the low-rate voice bit stream typically includes additional error control bits that increase the total data rate from the voice data rate of 2450 or 4000 bps up to a voice channel data rate 3600 or 7200 bps, respectively. The additional error control bits in P25 and DMR radios are in form of Golay and Hamming codes as shown in FIG. 3A for a Full-Rate vocoder and FIG. 4A for a Half-Rate vocoder. However, other forms of coding such as convolutional codes or turbo codes also may be used. The function of error correction codes is to allow the receiver to correct and/or detect certain bit errors that may be introduced into the received bit stream due to channel noise or other sources of error. This increases the reliability of communication across a radio channel.

Figure 4A:
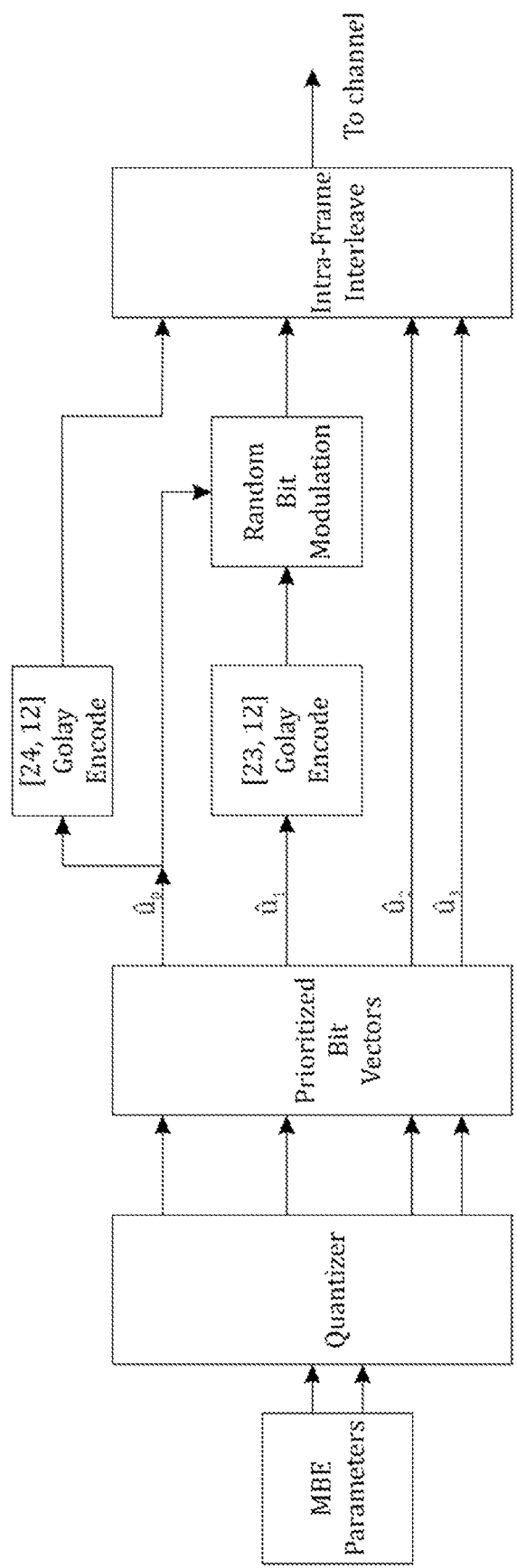

The encoder may function as described in TIA 102BABA to process sets of overlapping voice samples to produce a frame of voice bits every 20 ms (i.e., at a 50 Hz frame rate). Two different modes of operation may be used: a Full-Rate mode and a Half-Rate mode. In the Full-Rate mode (as illustrated in FIGS. 3A and 3B), the frame consists of 88 voice bits, while in the Half-Rate mode (as illustrated in FIGS. 4A and 4B), the frame consists of 49 voice bits (or less if optional bit stealing is used), where for each voice frame, the bits are allocated between various MBE parameters as shown in Table 1A for Full-Rate and Table 1B for Half-Rate. MBE parameters include a fundamental frequency parameter that represents the pitch period of the frame, a set of voiced/unvoiced (V/UV) decisions representing the voicing state in different frequency bands, a gain parameter that represents the level or amplitude of the frame, and a set of spectral magnitudes that represent the spectral envelope of the speech in the frame.

TABLE 1A

Full-Rate Voice Frame Bit Allocation

| MBE Parameter | # of Bits | Quantizer Value |
|---|---|---|
| Fundamental Frequency | 8 | $\hat{b}_0$ |
| V/UV Decisions | K = [3, 12] | $\hat{b}_1$ |
| Gain | 6 | $\hat{b}_2$ |
| Spectral Magnitudes | 73-K | $\hat{b}_3 \hat{b}_4 \ldots \hat{b}_{L+1}$ |
| Reserved | 1 | $\hat{b}_{L+2}$ |
| Total Voice Bits/Frame | 88 | |

TABLE 1B

Half-Rate Voice Frame Bit Allocation

| MBE Parameter | # of Bits | Quantizer Value |
|---|---|---|
| Fundamental Frequency | 7 | $\hat{b}_0$ |
| V/UV Decisions | 5 | $\hat{b}_1$ |
| Gain | 5 | $\hat{b}_2$ |
| Spectral Magnitudes | 32 | $\hat{b}_3 \hat{b}_4 \ldots \hat{b}_8$ |
| Total Voice Bits/Frame | 49 | |

For each MBE parameter, a quantizer is used to map the value of the parameter as estimated by the encoder into a quantizer value including the number of bits shown in Tables 1A and 1B. For example, in the Full-Rate vocoder, the fundamental frequency parameter is assigned 8 bits and is represented by the 8 bit quantizer value $\hat{b}_0$ carrying the information on the quantized value of the fundamental frequency for a voice frame. This process is repeated for each parameter in the voice frame to produce a frame of voice bits totaling 88 bits for Full-Rate and 49 bits for Half-Rate. Note that for Full-Rate, as shown in Table 1A, a variable number of bits, K in the range $3 \leq K \leq 12$, is used to quantize the voicing decisions leaving (73–K) bits to quantize the L spectral magnitudes, where $9 \leq L \leq 56$. In Half-Rate, as shown in Table 1B, a fixed number of bits is used to quantize each of the MBE parameters.

The output structure for each Full-Rate voice frame is shown in FIG. 3B and is produced by mapping the quantizer values for the frame, including a total of 88 bits, into a set of eight bit vectors, denoted as $\hat{u}_0$ $\hat{u}_1$ $\hat{u}_2$ $\hat{u}_3$ $\hat{u}_4$ $\hat{u}_5$ $\hat{u}_6$ $\hat{u}_7$. Note that FIG. 3B assumes that K=6 and L=16, and that the output structure is similar for other values of K and L as described in TIA 102BABA. The eight bit vectors produced in this manner may be combined with additional error correction bits in the form of Golay and Hamming codes, which increases the frame size to 144 bits. In the Full-Rate vocoder, frames are produced every 20 ms resulting in an output bit stream at 7200 bps.

Similarly, the output structure for each Half-Rate voice frame is shown in FIG. 4B and is produced by mapping the quantizer values for the frame, comprising a total of 49 bits, into a set of four bit vectors, denoted as $\hat{u}_0$ $\hat{u}_1$ $\hat{u}_2$ $\hat{u}_3$. The four bit vectors produced in this manner then may be combined with additional error correction bits in the form of Golay codes, which increases the frame size to 72 bits. In the Half-Rate vocoder, frames are produced every 20 ms resulting in an output bit stream at 3600 bps.

The decoder described in TIA 102BABA reverses the processing of the encoder. The decoder receives a low-rate voice bit stream at 7200 bps or 3600 bps depending on its mode of operation, and segments this bit stream into individual voice frames. When error correction coding has been employed, the decoder corrects and/or detects bit errors using the additional error correction bits and then reconstructs the MBE parameters for each frame. The MBE parameters are used to produce a 20 ms sequence of decoded voice samples that are output from the decoder for eventual presentation to a listener via a Digital-to-Analog Converter and a loudspeaker.

As part of the bit error correction and detection processing, the decoder may determine whether a frame is too corrupted for use (i.e., the frame is lost). This determination may be based on the number of errors detected in the frame or because one or more of the received parameter values has a disallowed value. When a lost frame is identified, the decoder performs a frame repeat, which replaces the MBE parameters for the current frame with those from a previous frame that was not corrupted. This frame repeat processing mitigates the effect of the corrupted frame on the decoded voice.

The above description summarizes the operation of the vocoder in a digital mobile radio system such as is used in P25, DMR, dPMR and NXDN. In these systems, the low-rate voice bit stream as produced by the encoder is combined with auxiliary data within a transmitting radio or other device and sent to a receiving radio or other device. The auxiliary data typically includes header, ID, control and synchronization data as well as other data fields that may be used for user or system specific functions and features. More information on digital mobile radio operation, auxiliary data and features can be found in the standard documents for the respective systems.

In the system 100, coordination is not required between the data-enabled vocoder of one device and the data-enabled vocoder of another device. Instead, placement of non-voice data within a voice frame is performed in a manner that can be detected by a data-enabled decoder without reliance on a communicated schedule or other timing information and without requiring any signaling between the encoder and decoder outside of the voice frame itself. The placement of non-voice data without reference to a schedule enables the data-enabled encoder to best place the data to preserve voice quality without increasing delay.

Figure 5:
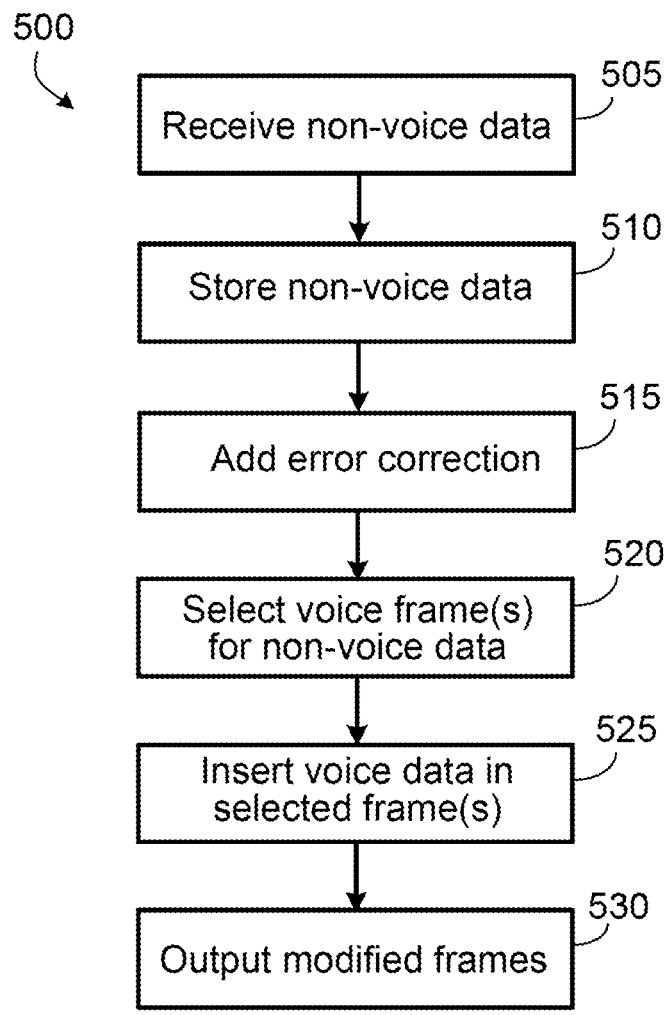
FIGS. 5 and 7 are flow charts showing operation of a data-enabled encoder.

Referring again to FIG. 2, and referring also to FIG. 5, the data-enabled encoder 240 processes the non-voice data 260 according to a process 500. Initially, the encoder 240 receives the non-voice data 260 from the one or more sensors 210 (step 505) and stores the non-voice data in a queue for subsequent transmission (step 510). Prior to transmission, the encoder 240 may supplement the non-voice data with additional error correction data for added reliability (step 515). The data-enabled encoder 240 then selects one or more voice frames to carry the non-voice data (step 520), and then inserts non-voice data from the queue and any additional error correction data in place of a substantial portion of the voice bits for the selected frame (step 525). The encoder 240 then outputs the resulting frame containing the non-voice data as part of a low-rate voice bit stream suitable for transmission over a radio or other communication link (step 530). In one implementation, placement of non-voice data into a selected voice frame is divided into a first portion of the frame into which non-voice identifier bits are placed, followed by a second portion of the frame into which the non-voice data from the queue along with any additional error correction or other data is placed. The non-voice identifier bits may be predetermined and known by the data-enabled encoders and data-enabled decoders of all data-enabled devices. A data-enabled decoder can then check each frame in a received bit stream for the known non-voice identifier bits to determine which frames contain non-voice data. The location and value of the non-voice identifier bits can be set such that they reduce the perceived effect of the non-voice data on the voice bit stream thereby maintaining voice quality even when the non-voice data is received by a legacy decoder without data capability. This allows new transmitters employing a data-enabled encoder to be backward compatible with existing receivers employing a legacy decoder.

Multiple approaches may be used for the selection of voice frames to carry the non-voice data. One approach involves analyzing the digital voice signal input to the encoder and selecting voice frames that have a lower effect on voice quality. These may include voice frames that are virtually inaudible because of their low level, or voice frames that are redundant because they have a high degree of similarity with preceding frames. Another selection approach may be based on the priority of the data. For example, if an urgent data message must be sent within a certain amount of time, then the selection may incorporate this constraint while doing so in a way that minimizes negative impacts on the resulting voice quality. In some communication systems, certain periods of the voice channel may be unused and these can be selected to carry non-voice data without having any impact on voice communications. An example of this is in the final logical data units (LDUs) at the end of a push-to-talk burst in a P25 Phase 1 (FDMA) radio system, which often contain voice frames that are "filled" with low level signals to complete the nine voice frames that comprise an LDU. These fill frames can be selected to carry non-voice data with no adverse effect on voice quality.

Figure 6:
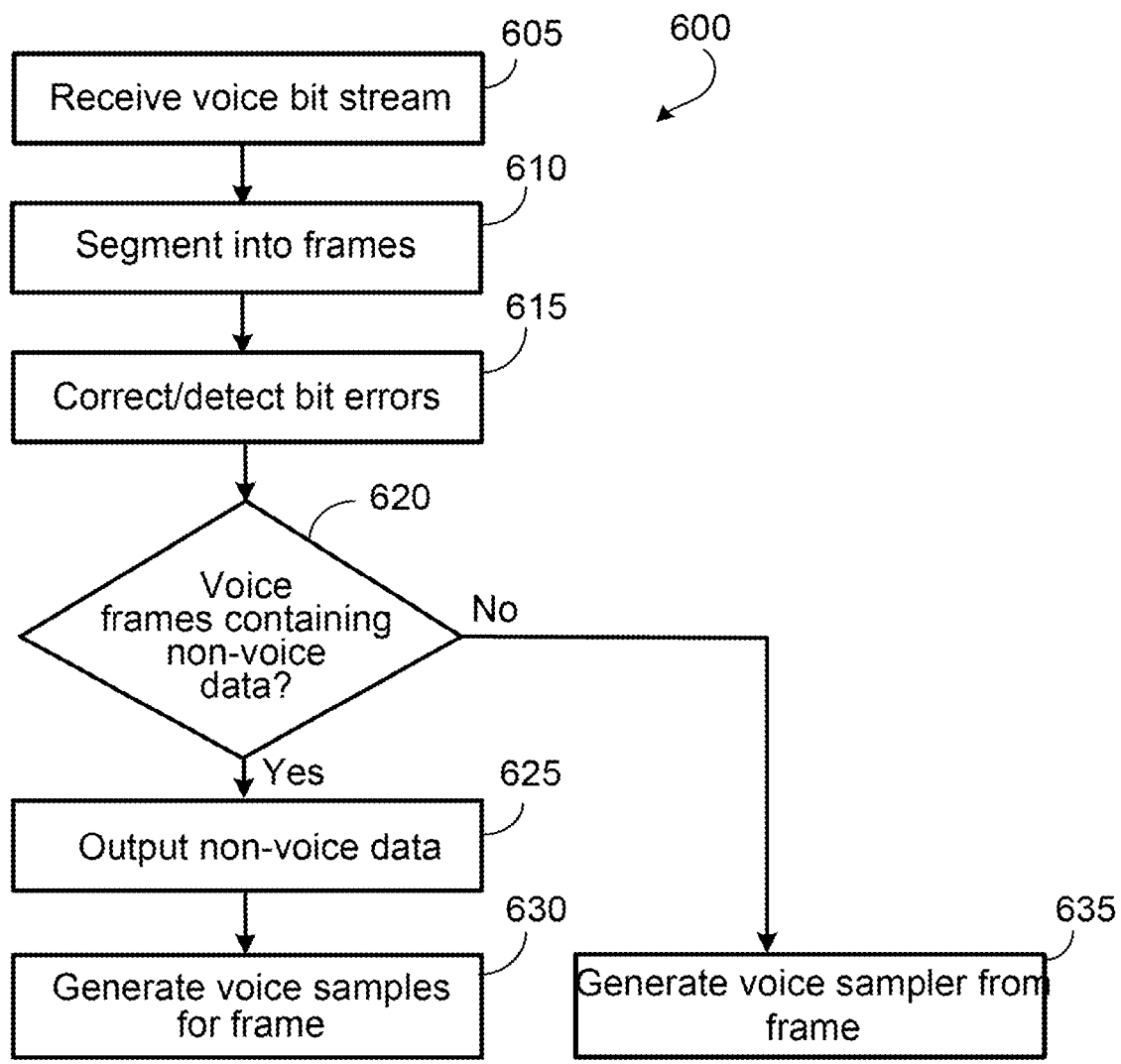
FIG. 6 is a flow chart showing operation of a data-enabled decoder.

Referring to FIG. 6, the data-enabled decoder 245 operates to process non-voice data according to a procedure 600. Initially, the decoder 245 receives a low-rate voice bit stream which may have been transmitted over a radio or other communication link (step 605), and segments the bit stream into individual voice frames (step 610). When error correction has been employed, the decoder corrects and/or detects bit errors using the additional error correction bits included in the bit stream (step 615). Next, the decoder detects voice frames containing non-voice data that have been added to the bit stream using the techniques described above (step 620). When non-voice data is detected, the decoder outputs the non-voice data (step 625) and also generates voice samples to represent a frame including non-voice data (step 630) by performing a frame repeat or other form of lost frame processing on voice frames which are identified as containing non-voice data. When non-voice data is not detected, the decoder voice samples from the frame (step 635).

In addition to non-voice data input from outside the vocoder, other data may be sent between the data-enabled encoder and decoder. This other data may include additional error correction data to reduce bit errors that may occur during transmission. Other data also may include packet type data to allow different forms or segments of non-voice data to be intermixed within the same bit stream, or reserved bits that are included for possible future use.

In the standard vocoder described in TIA 102BABA, the encoder quantizes the fundamental frequency parameter which is the inverse of the pitch period using 7 or 8 bits depending on the mode of operation, where Half-Rate mode (used in P25 Phase 2 TDMA, DMR, dPMR and NXDN) uses 7 bits and Full-Rate mode (used in P25 Phase 1 FDMA) uses 8 bits. In either case, the standard specifies that one or more of the quantized values representing the fundamental frequency are reserved and not used by the encoder in the existing system. A decoder that receives one of these reserved values knows that the reserved value is disallowed and hence the received voice frame is invalid. The decoder will ignore the remaining bits within such an invalid frame, and will perform a frame repeat using the last valid frame that the decoder received. This feature in the vocoder allows the remaining bits in the voice frame to be used for other purposes, such as, for example, carrying non-voice data.

A data-enabled encoder may use one or more of these reserved fundamental frequency values as an identifier to signal that a voice frame contains non-voice data, and then may place non-voice data in the remaining parts of the frame. A data-enabled decoder may recognize this reserved fundamental frequency value as identifying that the remaining bits in the voice frame contain non-voice data and then extract the non-voice data from the remaining parts of the frame. Detection at the decoder of the reserved fundamental frequency value causes the associated frame to be declared invalid and a frame repeat to be performed. Furthermore, such detection by a data-enabled decoder will cause the data-enabled decoder to output the non-voice data to the location or other non-voice service. While a legacy decoder will not understand the meaning of the non-voice data, the legacy decoder will detect the frame as invalid and consequently perform a frame repeat as in a data-enabled decoder. This ability of a legacy decoder to ignore the non-voice data lowers the perceived effect of the non-voice data on the voice bit stream. The data-enabled encoder may select which voice frames are best used to convey non-voice and then use the selected frames to carry the non-voice data, by using the reserved fundamental frequency value and placing the non-voice data in the remaining bits of the selected frames as described above. The result is a backward compatible method for sending data within the low-rate voice bit stream that preserves voice quality and maintains reasonable latency in the non-voice data transmission.

As described in TIA 102BABA, a legacy decoder used in a P25, DMR, dPMR or NXDN radio system includes a mechanism to perform a frame repeat when frames are received which are determined to be invalid (i.e., lost or excessively corrupted). The frame repeat procedure reuses the MBE parameters from the last good frame received by the decoder and uses these repeated parameters to compute the voice samples for the current frame. The result is that the repeated frame has similar speech properties (e.g., pitch, gain, voicing, and spectral envelope) to the previous frame from which the repeated MBE parameters originated, and the listener perceives the sound from the previous frame being extended into the current frame.

Improved techniques are provided for measuring the similarity between two consecutive voice frames, and, when this measure indicates the current voice frame is sufficiently similar to the preceding frame, then the current voice frame may be selected to carry non-voice data by sending a reserved value for the fundamental frequency and non-voice data in the remaining bits. This approach has the advantage that frame repeats within a receiving decoder will occur when the voice signal does not change significantly between frames, lessening any impact on voice quality and intelligibility. The data-enabled encoder also may be configured to account for the behavior of the decoder when encoding subsequent frames. For example, during a frame when non-voice data is sent along with a reserved value for the fundamental frequency parameter, the decoder will ignore the received data for that frame as part of its frame repeat processing, and hence the quantizer state information which stores the prior value of the MBE speech model parameters will not be updated within the decoder during that frame (i.e., the decoder quantizer state will be carried forward from the prior frame resulting in little or no modification to the value of the MBE speech model parameters that are stored for the prior frame). A data-enabled encoder can account for this by not updating its own quantizer state information for that frame, so that the quantizer states are kept in sync between the encoder and decoder. This technique may be particularly advantageous in conjunction with the vocoder described in TIA 102BABA, which uses differential quantization for the spectral magnitudes, such that keeping the MBE parameter state in sync between the encoder and the decoder will improve voice quality and intelligibility.

In particular implementations, a data-enabled encoder measures similarity between two consecutive voice frames by comparing the fundamental frequencies, voicing decisions and/or the spectral magnitudes between the two consecutive frames, and selecting a frame to carry non-voice data if the difference in these parameters between the two frames is below certain limits. In one of these implementations, all of these parameters are compared using a particular set of similarity metrics.

Figure 7:
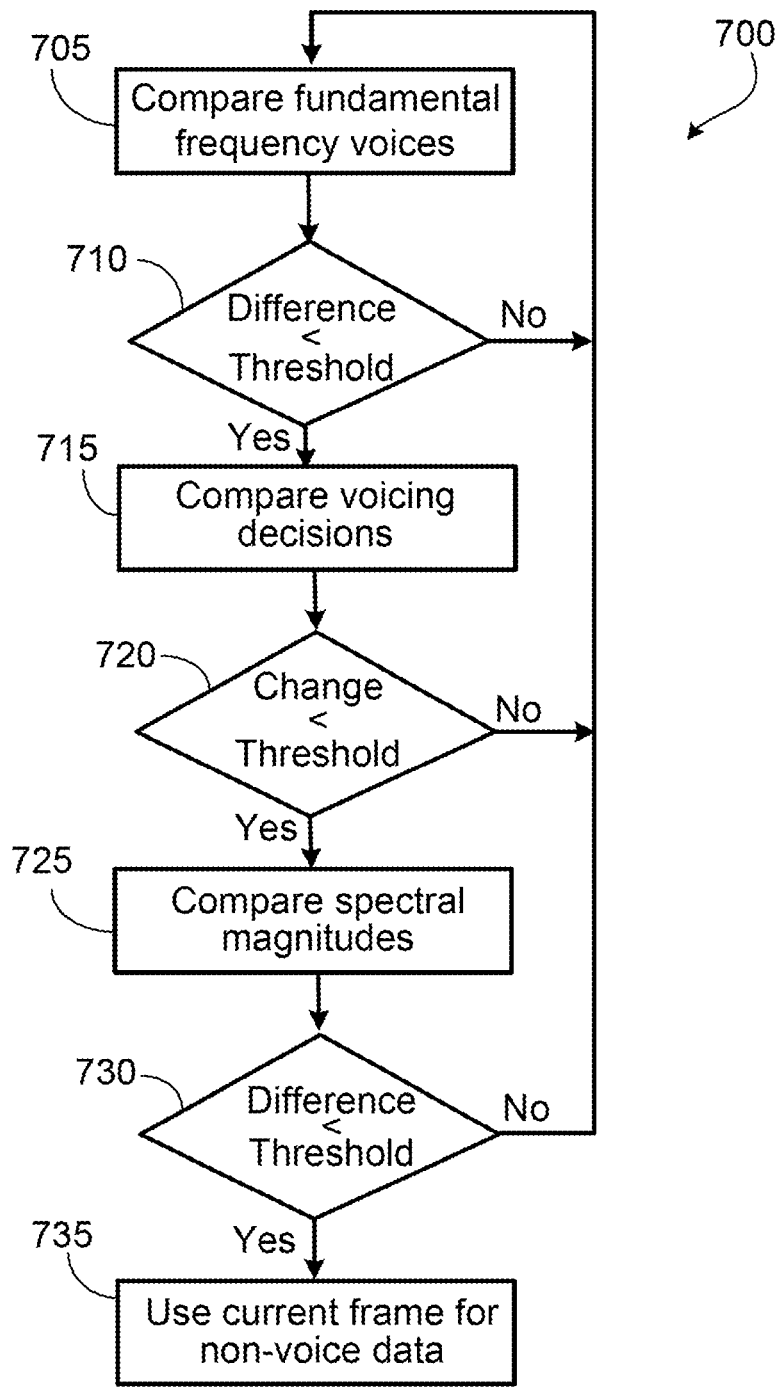

For example, referring to FIG. 7, in one implementation the encoder operates according to a procedure 700. Initially, the encoder compares the fundamental frequency parameter for a frame to the fundamental frequency parameter for the immediately preceding frame (step 705). If the relative change between the two is less than a predetermined amount (e.g., 3.5%) (step 710), the encoder compares the voicing decisions for the frames (step 715). Otherwise, the encoder does not use the current frame to carry non-voice data but instead waits for the next frame to restart the comparison process by examining the fundamental frequency parameter for the next frame (step 705).

The voicing decisions between two consecutive frames may be compared (step 715) by checking if the number of bands in which the voicing decisions have changed from voiced to unvoiced or vice versa is less than a second predetermined amount (e.g., no more than 1 band out of 8). If the relative change is less than the second predetermined amount (step 720), the encoder compares the spectral magnitudes for the frames (step 725). Otherwise, the encoder does not use the current frame to carry non-voice data but instead waits for the next frame to restart the comparison process (step 705).

The similarity between the spectral magnitudes for two consecutive voice frames may be compared (step 725) by summing the difference between the weighted log spectral magnitudes in the two frames. Let $M_k(1)$ and $M_k(0)$ represent the log (base 2) spectral magnitude of the k'th harmonic in the current and previous frame, and the parameters $L(1)$ and $L(0)$ represent the number of spectral magnitudes in those frames. Similarly, the parameters $v_k(1)$ and $v_k(0)$ represent the voicing state associated with their respective spectral magnitudes, where the voicing state $v_k(n)=1$ if the k'th spectral magnitude is voiced while $v_k(n)=0$ otherwise. The parameter $N_k$ represents a noise floor for the k'th harmonic, and $W_k$ represents a weighting value for that harmonic. Using these variables, a difference metric, D, between these two consecutive frames can then be computed as follows:

$$D = \frac{\sum_{k=1}^{max[L(0),L(1)]} W_k \times |v_k(1) \times Z_k(1) - v_k(0) \times Z_k(0)| \times max[Z_k(1), Z_k(0)]}{\sum_{k=1}^{max[L(0),L(1)]} max[Z_k(1), Z_k(0)]}$$

where $Z_k(n)$ is computed as:

$$Z_k(n) = \begin{cases} M_k(n), & \text{if } M_k(n) > N_k \\ \frac{N_k \times N_k}{2 \times N_k - M_k(n)}, & \text{otherwise} \end{cases}$$

and the weighting function Wk is given by:

$$W_k = \begin{cases} 1.0, & \text{if } v_k(0) = 0 \text{ and } v_k(1) = 0 \\ 0.6, & \text{otherwise} \end{cases}$$

The noise floor $N_k$ can be estimated from the silence (background noise) portions of the voice signal, or a fixed value can be used. For example, the value of $N_k$ may be determined by:

$$N_k = 2 - \frac{k}{max[(L(1), L(0)]}$$

The difference metric, D, shown above is near zero if the spectral magnitudes and their associated voicing states are approximately the same in the two frames and grows to a larger value as the spectral magnitudes and/or their voicing states diverge between the two frames.

The difference metric D can be compared to a threshold, T, and if D<T (step 730), then the frames are sufficiently similar and the encoder allows the current frame to be used to carry non-voice data as per the techniques described (step 735). Otherwise, the encoder does not use the current frame to carry non-voice data but instead waits for the next frame to restart the comparison process (step 705).

In an alternative approach, the threshold T can be made adaptive such that initially T is low (e.g., 0.4 for Half-Rate or 0.5 for Full-Rate) so as to require consecutive frames to be very similar before non-voice data insertion is activated, and then T is increased over time (for example from 0.4 to 0.75 over 15 frames for Half-Rate and from 0.5 to 0.75 over 15 frames for Full-Rate), so that the degree of similarity for non-voice data insertion becomes more likely. Once data insertion has occurred (because D<T) then T can be reduced back to a lower value (e.g., 0.3) for one frame since it is desirable to not do multiple frame repeats in a row, and then reset to the initial low value (0.4 or 0.5) and increased again over time. Using this adaptive approach means that, at the beginning, frames will only be used for non-voice data if they are very similar, with this condition being relaxed over time to reduce the time it takes for a frame suitable for data insertion to be found. This lowers the latency (i.e., delay) in sending non-voice data. In practice, frames containing silence or low level background noise have very low values of D and are likely to meet the more demanding requirements associated with the low (initial) value of T. Stationary voice sounds (such as vowels) also have moderately low values of D, and will support data insertion possibly after some time for T to adjust if no silence period is found beforehand.

Other implementations may compare only a subset of the parameters and/or employ different similarity metrics.

In the techniques described above, a data-enabled encoder uses a reserved value of the fundamental frequency to signal to a data-enabled decoder that the frame contains non-voice data. The presence of the reserved fundamental frequency value causes a legacy decoder (and a data-enabled decoder) that receives such a frame to determine that the frame is invalid and perform a frame repeat. This reduces the perceived effect of the non-voice data on the decoded voice while providing backward compatibility with existing radios featuring legacy decoders. The reserved fundamental frequency value can be used by a data-enabled decoder to identify frames containing non-voice data and then further process the frame to recover the non-voice data and output that data for other uses.

An alternative encoding and decoding method may be used to carry the non-voice data within a selected frame. With this method, a data-enabled encoder selects frames to carry the non-voice data using the methods and techniques described, where this selection may be based at least in part on a measure of similarity between two consecutive frames. Non-voice data is then placed in the selected frames using an alternate encoding method which is different than the encoding method used for voice frames such that the frames carrying the non-voice data can be identified as invalid. In one implementation, which functions in combination with the vocoders described in TIA 102BABA, the encoding method uses different error control codes such as convolutional codes, either alone or in combination with a CRC or checksum, while the encoding for voice frames uses the same Hamming and/or Golay codes as employed by the legacy encoder. In this implementation, a frame is identified as invalid if the number of bit errors computed during decoding exceeds a certain threshold, so the alternate encoding method is designed such that, when a frame containing non-voice data is decoded using the decoding method used for voice frames, the computed number of bit errors will exceed the threshold and the frame will be identified as invalid thereby providing backward compatibility with legacy decoders This is facilitated by including a small number of header bits (4-8 header bits is typical) as part of non-voice data, and then setting the value of the header bits so that the maximum number of bit errors will be computed when decoded using the decoding method used for voice frames. As noted above, the data-enabled encoder may account for the behavior of an invalid frame on the decoder by not updating its quantizer state information for the frames selected to carry the non-voice data, so that the quantizer states are kept in sync between the encoder and the decoder.

A decoder receiving a bit stream using an alternate encoding method to carry non-voice data will attempt to decode each frame using the decoding method for voice frames which is the same decoding method used in the legacy decoder. In one implementation, the beneficial design of the alternate coding method and the setting of optional header bits causes the number of bit errors that are computed when decoding a frame containing non-voice data with the decoding method for voice frames to exceed a certain threshold and the frame to be identified as invalid. The decoder (both data-enabled and legacy) will then perform a frame repeat for these invalid frames and not update its quantizer state information, thereby keeping the decoder quantizer state in sync with that used by the encoder. The data-enabled decoder then applies the alternate decoding method to such invalid frames and, if non-voice data is detected (due to sufficiently few bit errors and/or the correct CRC or checksum), then the non-voice data is recovered from the frame and output for other uses. The alternate encoding and decoding method for carrying non-voice data can provide error protection that is optimized for the non-voice data and can be adapted to provide better error protection (using lower rate coding) or to carrying more non-voice data per frame.

Other implementations feature improved techniques for carrying non-voice data during silence periods or other times of low speech activity. In TIA 102BABA, the encoder quantizes the gain parameter using 5 or 6 bits depending on the mode of operation, where Half-Rate mode uses 5 bits (32 levels) and Full-Rate mode uses 6 bits (64 levels). The gain parameter represents the average log amplitude of the voice signal during a particular 20 ms voice frame, and, when the decoder receives a frame that contains the quantization value representing a low level for the gain parameter (typically at or near the zero value), the decoder produces a low-level voice signal. This provides a mechanism to carry non-voice data, as the resultant decoded voice signal is so low level that it is essentially inaudible regardless of the quantization values used for spectral magnitudes and V/UV decisions. Hence the data-enabled encoder can set the gain to a low level and then replace the voice bits normally used for the spectral magnitudes and V/UV decisions with non-voice data. The voice bits normally used for the fundamental frequency also can be replaced with non-voice data, though certain implementations may set some of these bits to a predetermined value to improve the ability of the data-enabled decoder to detect frames containing non-voice data.

A data-enabled encoder selects voice frames to carry non-voice data. This may be accomplished by analyzing the voice signal being encoded to identify intervals corresponding to silence (typically low-level background noise), and then using this information to select such voice frames. Alternately, the data-enabled encoder may select voice frames for immediate transmission or within a tolerable latency based on the priority of the data. In one application of interest, the encoder selects voice frames at the end of a transmission burst with the option to extend the burst (i.e., by transmitting additional LDUs in TIA 102BABA) to carry additional non-voice data. Once frames have been selected, the data-enabled encoder sets some number of the most significant gain bits and the most significant fundamental frequency bits to a predetermined value and places the non-voice data in bits normally used for the spectral magnitudes and V/UV decisions. The predetermined values used for the most significant gain and fundamental frequency bits serve as an identifier allowing a data-enabled decoder to detect that the frame contains non-voice data. In addition, the value used (typically zero) represents a low-level voice frame with a short pitch period, which reduces the perceived effect of the non-voice data on the voice bit stream.

A data-enabled decoder examines the most significant bits of the gain and fundamental frequency for each voice frame, and if the data-enabled decoder detects the predetermined values indicating the presence of non-voice data, the data-enabled decoder recovers the non-voice data from bits normally used for the spectral magnitude and V/UV decisions, and outputs the recovered non-voice data for other uses. The predetermined values for the gain and fundamental frequency indicating the presence of non-voice data may be near zero and correspond to low level voice frame with a short pitch period. It is rare for these particular values to occur during normal voice, which allows the data-enabled decoder to reliably determine the presence of non-voice data by checking these values in every received frame.

In both existing legacy and data-enabled decoders, the presence of non-voice data in the bits normally assigned to the spectral magnitudes and V/UV decisions will cause perturbations in the spectrum of the decoded voice since the non-voice data will be used in the decoder to reconstruct the spectral magnitude and voicing parameters. However, the small level for the gain parameter ensures that these perturbations are virtually inaudible, which reduces the perceived effect of the non-voice data on decoded voice. The data-enabled encoder may account for these perturbations when encoding subsequent frames. For example, during a frame when non-voice data is sent along with a small value for the gain parameter, the decoder will use the non-voice data for that frame to decode the spectral magnitude parameters and update internal state information for its MBE parameters accordingly. The data-enabled encoder can account for this by updating its own similar state information for that frame using the non-voice data being transmitted, so that the MBE parameter state is kept in sync between the encoder and decoder. This may be particularly useful with the vocoder described in TIA 102BABA, which uses differential quantization for the spectral magnitudes. In general, keeping the MBE parameter state in sync between encoder and decoder improves voice quality and intelligibility. A data-enabled decoder can further reduce the audibility of any such perturbations in the spectrum of the decoded voice by muting or otherwise attenuating the voice signal whenever the data-enabled decoder detects the presence of non-voice data in the bits normally assigned to the spectral magnitudes.

Non-voice data may be carried at the end of a voice burst with little or no impact on voice quality or intelligibility. For example, voice communication in P25 Phase 1 (FDMA) radio systems uses 180 ms logical data units (LDU's) that each contain nine 20 ms Full-Rate voice frames. When voice ends, typically due to release of the Push-to-Talk (PTT) button at the transmitting radio, any remaining voice frames in the LDU must be filled with some appropriate pattern (i.e. "voice fill frames") to complete the LDU. Typically, a pattern signaling a lost voice frame (i.e., with too many bit errors or an invalid value for one or more of the MBE parameters), or a pattern signaling silence (i.e., low level background noise) is used for the voice fill frames, both of which the decoder will recognize and handle appropriately, which wastes the capacity of the channel. To better use the capacity of the channel, one or more of the described methods can be used during these voice fill frames to send non-voice data. If more non-voice data needs to be sent, additional LDUs can be transmitted with voice fill frames containing non-voice data. These methods are also applicable to other radio systems, including P25 Phase 2 (TDMA), DMR, dPMR and NXDN.

In a typical digital radio system, the wireless link connecting the transmitter and receiver is prone to RF noise that introduces bit errors into the received bit stream. The vocoder described in TIA 102BABA addresses this problem via error control coding (FEC) in the form of Golay and Hamming codes that are used to protect a fraction of the voice bits within each voice frame. In the Full-Rate mode of operation, 4 Golay Codes and 3 Hamming codes are used during each voice frame to protect 81 of the voice bits. Similarly, in the Half-Rate mode of operation, 2 Golay codes are used to protect 24 voice bits. In both cases, the remaining bits (7 in Full-Rate and 25 in Half-Rate) receive no FEC protection as they normally contain voice bits that are not particularly sensitive to bit errors. While this prioritized form of error protection works well for the voice bits used by the P25 vocoder, it may not be suitable for non-voice data where it may not be correct to assume that any portion of the data is less sensitive to bit errors than other portions. In this case, additional error correction bits may be employed by the data-enabled encoder and decoder to protect the non-voice data. For example, 24 of the 25 unprotected bits in the Half-Rate mode may be used to form a third Golay code whenever non-voice data is carried in a frame. This allows for 12 more bits of the non-voice data to be protected and leaves only 1 unprotected bit. Similarly, the Full-Rate mode may form a 3× repetition code from the 3 Hamming codes (i.e., transmitting the same data 3 times), allowing 11 additional bits of the non-voice data to be strongly protected. The additional error correction may form part of the non-voice data inserted by the data-enabled encoder. The data-enabled decoder then uses this additional error correction to supplement the standard error control coding used for voice frames, thereby improving reliability of the non-voice data.

Several methods for placing non-voice data into voice frames have been described. For each method, the voice frame carrying the non-voice data can be viewed as a data packet. Data packets that may be employed include those shown in FIGS. 8A-11B. Each data packet is typically divided into several portions or fields, including a packet ID field that is intended to distinguish frames containing non-voice data from other frame types (i.e., ordinary voice, tone or silence frames). The value and location of the packet ID field may be selected to provide good discrimination between frames carrying non-voice data and other frame types. In addition, the value and location of the packet ID may be set to reduce the perceived effect of the non-voice data on the voice bit stream thereby maintaining voice quality even when received by a legacy decoder without data capability. Other fields in the data packet make up the non-voice data carried in the frame and may include: (1) a packet type field that indicates the type of non-voice data contained in the packet, thereby supporting multiple data types such as longitude data or latitude data; (2) a reserved data field to allow for future expansion and support of other features; (3) a data message field containing non-voice application data; and (4) additional error control data beyond that supported for voice frames to allow for better correction and/or detection of bit errors that may be introduced into the non-voice packet during transmission.

A data-enabled decoder examines each frame of bits within a received bit stream to detect the packet IDs corresponding to each variant of data packet as shown in FIGS. 8A-11B. If a packet ID is detected, then the non-voice data is recovered from the remaining portion of the frame and output for other uses.

A Full-Rate Variant 1 data packet, shown in FIG. 8A, features a packet ID field comprising a small number of predetermined bits that represent a reserved value for the fundamental frequency parameter used by the Full-Rate vocoder. A Full-Rate Variant 2 data packet, shown in FIG. 9A, features a packet ID field comprising a small number of predetermined bits that represent a small value of the gain parameter and additional predetermined values for at least some of the bits used for the fundamental frequency parameter in the Full-Rate vocoder. A Half-Rate Variant 3 data packet, shown in FIG. 10A, features a packet ID field comprising a small number of predetermined bits that represent a reserved value for the fundamental frequency parameter used by the Half-Rate vocoder. A Half-Rate Variant 4 data packet, shown in FIG. 11A, features a packet ID field comprising a small number of predetermined bits that represent a small value of the gain parameter and additional predetermined values for at least some of the bits used for the fundamental frequency parameter in the Half-Rate vocoder. The non-voice data packets shown in FIGS. 8A-11B are only representative of the methods described, and particular implementations may employ modifications or variations of these data packets. For example, one could change the packet ID to include portions of the V/UV decision bits or spectral magnitude bits. Furthermore, the number and location of packet type bits are completely variable as is the trade-off between the number of data message bits and additional error control data.

One variant of non-voice data packet used with the Full-Rate vocoder is referred to as Variant 1 and is shown in FIGS. 8A and 8B. The components of this packet include a packet ID field comprising 6 bits, denoted as $I_5 I_4 I_3 I_2 I_1 I_0$. The packet ID field in a Full-Rate Variant 1 packet is preferably set equal to 0x3C since this value represents a reserved fundamental frequency value in the Full-Rate vocoder and does not regularly occur for voice frames. This packet also preferably includes a packet type field comprising 3 bits, denoted by $T_2 T_1 T_0$, allowing 8 different packet types to be identified, and a 3 bit reserved data field, denoted by $R_2 R_1 R_0$, which can be used for extra signaling capacity, increased performance or to support additional features. The data message field for this packet as shown in FIG. 8A consists of 48 bits, denoted by $M_{47} M_{46} M_{45} \ldots M_2 M_1 M_0$, which contains the non-voice data being transmitted over the channel.

The output structure of the Variant 1 data packet used with the Full-Rate Vocoder is shown in FIG. 8B. The Full-Rate vocoder, as described in TIA-102BABA and illustrated by FIGS. 3A and 3B, uses a set of 8 bit vectors denoted by $\hat{u}_0, \hat{u}_1 \ldots \hat{u}_7$ containing 88 bits for each 20 ms voice frame. The data-enabled encoder transmits non-voice data by mapping the component data fields shown in FIG. 8A into these bit vectors as shown in FIG. 8B, where bit position within each vector follows the conventions used in TIA-102BABA. The bit vector $\hat{u}_0$ consists of the 6 bit packet ID field, $I_5 I_4 I_3 I_2 I_1 I_0$, followed by the 3 bit Type field, $T_2 T_1 T_0$, and ending with the 3 bit reserved bits, $R_2 R_1 R_0$. Next the first 36 bits of the data message field, $M_{47} M_{46} M_{45} \ldots M_{12}$ are output using 12 bits each in bit vectors $\hat{u}_1, \hat{u}_2,$ and $\hat{u}_3$. Bit vectors $\hat{u}_4, \hat{u}_5,$ and $\hat{u}_6$ are each identical and contain the next 11 bits of the data message, $M_{11} M_{10} \ldots M_1$. Finally, bit vector $\hat{u}_7$ contains the final bit of the data message, $M_0$, repeated three times and the last 4 bits are spare and not used. The Full-Rate Variant 1 data packet includes additional error control data in the form of a [3,1] repetition code applied to the last 12 bits of the data message, allowing the data-enabled decoder to better correct or detect bit errors in these bits and thereby increase reliability of transmission of the data message. After constructing all 8 of these bit vectors the data-enabled encoder applies the Golay and Hamming codes, bit modulation and interleaving as shown in FIG. 3A to produce a final 144 output frame which is suitable for transmission over the P25 Phase 1 common air interface.

A received frame containing a Full-Rate Variant 1 data packet constructed in the manner described herein will cause the Full-Rate legacy or data-enabled decoder to perform a frame repeat since the value used in the packet ID field (0x3C) represents a reserved fundamental frequency which will be interpreted by the decoder as an invalid frame. This triggering of a frame repeat helps maintain voice quality by lowering the perceived effect of the Variant 1 data packet on the voice bit stream. Furthermore, a data-enabled decoder can use the packet ID field to identify that a received frame contains non-voice data since a reserved fundamental frequency value does not regularly occur during voice frames.

Upon detection, a data-enabled decoder will preferably perform error control decoding using the Golay and Hamming codes shown in FIGS. 3A and 3B in combination with the additional error control data (i.e. the [3,1] repetition code) applied by the data-enabled encoder for a Variant 1 data packet. The data-enabled decoder then reconstructs the component fields of the data.

Another variant of non-voice data packet used with the Full-Rate vocoder is referred to as Variant 2 and is shown in FIGS. 9A and 9B. The components of this packet include a packet ID field comprising 11 bits, denoted as $I_{10} I_9 \ldots I_0$. The packet ID field in a Full Rate Variant 2 packet is preferably set equal to 0x000 corresponding to a near maximum fundamental frequency value combined with the minimum gain value allowed for the Full-Rate vocoder. The Variant 2 data packet also may include a packet Type field comprising 3 bits, denoted by $T_2 T_1 T_0$, allowing 8 different packet types to be identified, and a 1 bit reserved data field, denoted by $R_0$, which can be used for extra signaling capacity, increased performance or to support additional features. The data message field for this packet as shown in FIG. 9A consists of 48 bits, denoted by $M_{47} M_{46} M_{45} \ldots M_2 M_1 M_0$, which contains the non-voice data being transmitted over the channel.

The output structure of the Variant 2 data packet used with the Full-Rate Vocoder is shown in FIG. 9B. The data-enabled encoder transmits non-voice data within a Variant 2 data packet by mapping the component data fields shown in FIG. 9A into the 8 bit vectors $\hat{u}_0, \hat{u}_1 \ldots \hat{u}_7$ used by the Full-Rate vocoder as shown in FIG. 9B, where bit positions within each vector follow the conventions used in TIA-102BABA. The bit vector $\hat{u}_0$ consists of the first 8 bits of the bit packet ID field, $I_{10}, I_9, \ldots, I_3$, interlaced with the 3 bit type field $T_2 T_1 T_0$ and the 1 bit reserved data field $R_0$ as shown in the figure. Next the first 36 bits of the data message field, $M_{47} M_{46} M_{45} \ldots M_{12}$ are output using 12 bits each in bit vectors $\hat{u}_1, \hat{u}_2,$ and $\hat{u}_3$. Bit vector $\hat{u}_4$ contains 9 bits of the data message field combined with the next 2 bits of the packet ID field $I_2 I_1$. The construction of $\hat{u}_4$ differs depending on the state of the first type bit $T_2$. If $T_2=0$, then 3 data message bits $M_{11} M_{10} M_9$ are followed by 2 bits of the packet ID field $I_2 I_1$ which are in turn followed by the 6 data message bits $M_6 M_5 \ldots M_1$. However, if $T_2=1$, then 4 data message bits $M_{11} M_{10} M_9 M_8$ are followed by 2 bits of the packet ID field $I_2 I_1$ which are in turn followed by the 5 data message bits $M_5 M_4 \ldots M_1$. Bit vectors as and $\hat{u}_6$ are each identical and contain 11 bits of the data message, $M_{11} M_{10} \ldots M_1$. Finally, bit vector $\hat{u}_7$ contains the final bit of the data message, $M_0$, repeated three times followed by the final bit of the packet ID field $I_0$, an additional repetition of 2 of the data message bits (either $M_8 M_7$ if $T_2=0$ or $M_7 M_6$ if $T_2=1$), and a final unused bit. The Variant 2 data packet includes additional error control data in the form of a [3,1] repetition code applied to the last 12 bits of the data message, allowing the data-enabled decoder to better correct or detect bit errors in these bits and thereby increase reliability of transmission of the data message. After constructing all 8 of these bit vectors the data-enabled encoder applies the Golay and Hamming codes, bit modulation and interleaving as shown in FIG. 1 to produce a final 144 output frame which is suitable for transmission over the P25 Phase 1 common air interface.

The dependence of bit vectors $\hat{u}_4$ and $\hat{u}_7$ on the value of $T_2$ in the Variant 2 data packet ensures that the packet ID bits are placed into the bit vectors where the gain bits are normally carried in a Full-Rate voice frame. This causes the gain to be decoded to the minimum value (i.e. zero) when the data packet is received, and thereby improves voice quality by lowering the perceived effect of any perturbations in the decoded voice signal caused by the presence of the non-voice data in the voice bit stream. Furthermore, a data-enabled decoder uses the packet ID field (0x000) used for a Variant 2 data packet to identify that a received frame contains non-voice data since the represented combination of a near maximum fundamental frequency value with the minimum gain value does not regularly occur during Full-Rate voice frames. Upon detection, a data-enabled decoder will preferably perform error control decoding using the Golay and Hamming codes shown in FIG. 3A in combination with the additional error control data (i.e. the [3,1] repetition code) applied by the data-enabled encoder for a Variant 2 data packet. The data-enabled decoder then reconstructs the component fields of the data packet and outputs this data to the non-voice application.

A variant of a non-voice data packet used with the Half-Rate vocoder is referred to as Variant 3 and is shown in FIGS. 10A and 10B. The components of this data packet include a packet ID field comprising 7 bits, denoted as $I_6 I_5 I_4 I_3 I_2 I_1 I_0$ which is preferably set equal to 0x78 since this value represents a reserved fundamental frequency value in the Half-Rate vocoder and does not regularly occur for voice frames. This packet also preferably includes a 4 bit packet type field, denoted by $T_3 T_2 T_1 T_0$, allowing 16 different packet types to be identified, and a 2 bit reserved data field, denoted by $R_1 R_0$, which can be used for extra signaling capacity, increased performance or to support additional features. The data message field for this packet as shown in FIG. 10A consists of 24 bits, denoted by $M_{23} M_{22} \ldots M_0$, which contains the non-voice data being transmitted over the channel. In addition the Variant 3 data packet includes 12 additional error control bits, denoted by $P_{11} P_{10} \ldots P_0$, which are generated from the final 12 bits of the data message field $(M_{11} M_{10} \ldots M_0)$ according to the formula:

$$[P_{11}P_{10}P_9P_8P_7P_6P_5P_4P_3P_2P_1P_0]=$$
$$[M_{11}M_{10}M_9M_8M_7M_6M_5M_4M_3M_2M_1M_0] \times G_{[12,12]}$$

where the matrix $G_{[12,12]}$ is the parity check matrix associated with a [24,12] Golay code and is given by:

$$G_{[12,12]} = \begin{bmatrix} 1 & 1 & 0 & 0 & 0 & 1 & 1 & 1 & 0 & 1 & 0 & 1 \\ 0 & 1 & 1 & 0 & 0 & 0 & 1 & 1 & 1 & 0 & 1 & 1 \\ 1 & 1 & 1 & 1 & 0 & 1 & 1 & 0 & 1 & 0 & 0 & 0 \\ 0 & 1 & 1 & 1 & 1 & 0 & 1 & 1 & 0 & 1 & 0 & 0 \\ 0 & 0 & 1 & 1 & 1 & 1 & 0 & 1 & 1 & 0 & 1 & 0 \\ 1 & 1 & 0 & 1 & 1 & 0 & 0 & 1 & 1 & 0 & 0 & 1 \\ 0 & 1 & 1 & 0 & 1 & 1 & 0 & 0 & 1 & 1 & 0 & 1 \\ 0 & 0 & 1 & 1 & 0 & 1 & 1 & 0 & 0 & 1 & 1 & 1 \\ 1 & 1 & 0 & 1 & 1 & 1 & 0 & 0 & 0 & 1 & 1 & 0 \\ 1 & 0 & 1 & 0 & 1 & 0 & 0 & 1 & 0 & 1 & 1 & 1 \\ 1 & 0 & 0 & 1 & 0 & 0 & 1 & 1 & 1 & 1 & 1 & 0 \\ 1 & 0 & 0 & 0 & 1 & 1 & 1 & 0 & 1 & 0 & 1 & 1 \end{bmatrix}$$

The addition of these additional error control bits protects the portion of the data message that is not normally protected by error correcting codes for voice frame, and thereby improves the reliability of the non-voice data.

The output structure of the Variant 3 data packet used with the Half-Rate Vocoder is shown in FIG. 10B. The Half-Rate vocoder, as described in the "Half-Rate Annex" of TIA-102BABA and shown in FIG. 4A, uses a set of 4 bit vectors denoted by $û_0, û_1 \ldots û_3$ containing 49 bits for each 20 ms voice frame. The data-enabled encoder transmits non-voice data by mapping the component data fields shown in FIG. 10A into these bit vectors as shown in FIG. 10B, where bit positions within each vector follow the conventions used in TIA-102BABA. The bit vector $û_0$ consists of the 6 most significant bits of the bit packet ID field, $I_6 I_5 I_4 I_3 I_2 I_1$ followed by the 4 bit Type field, $T_3 T_2 T_1 T_0$, and ending with the 2 bit reserved bits, $R_1 R_0$. Next the first 23 bits of the data message field, $M_{23} M_{22} \ldots M_1$ are output in bit vectors $û_1$ and $û_2$. Finally, bit vector $û_3$ includes the last bit of the data message, $M_0$, followed by the LSB of the packet ID field, $I_0$, and then ending with the 12 error control bits $P_{11} P_{10} \ldots P_0$. After constructing all 4 of these bit vectors the data-enabled encoder applies Golay coding, bit modulation and interleaving as shown in FIG. 4A to produce a final 72 output frame which is suitable for transmission over the $P_{25}$ Phase 2 air interface.

A received frame containing a Variant 3 data packet constructed in the manner described herein will cause the Half-Rate legacy or data-enabled decoder to perform a frame repeat, since the value used in the packet ID field (0x78) represents a reserved fundamental frequency which will be interpreted by the decoder as an invalid frame. This triggering of a frame repeat helps maintain voice quality by lowering the perceived effect of the Variant 3 data packet on the voice bit stream. Furthermore, a data-enabled decoder can use the Variant 3 packet ID field to identify that such a received frame contains non-voice data since a reserved fundamental frequency value does not regularly occur during voice frames. Upon detection, a data-enabled decoder will preferably perform error control decoding using the Golay codes shown in FIG. 4A in combination with the additional error control data (i.e., the 12 additional error control bits denoted as $P_{11} P_{10} \ldots P_0$) applied by the data-enabled encoder for a Variant 3 data packet. The data-enabled decoder then reconstructs the component fields of the data packet and outputs this data to the non-voice application.

Another variant of non-voice data packet used with the Half-Rate vocoder is referred to as Variant 4 and is shown in FIGS. 11A and 11B. The components of this packet include a packet ID field comprising 9 bits, denoted as $I_8 I_7 \ldots I_0$. The packet ID field in a Half-Rate Variant 4 data packet is preferably set equal to 0x000 corresponding to a near maximum fundamental frequency value combined with a minimum gain value as defined for the Half-Rate vocoder. This packet also preferably includes a 4 bit packet type field, denoted by $T_3 T_2 T_1 T_0$, allowing 16 different packet types to be identified. The data message field for this packet as shown in FIG. 6A consists of 24 bits, denoted by $M_{23} M_{22} \ldots M_0$, which contains the non-voice data being transmitted over the channel. In addition, the Variant 4 data packet includes 12 additional error control bits, denoted by $P_{11} P_{10} \ldots P_0$, which are generated from the final 12 bits of the data message field $(M_{11} M_{10} \ldots M_0)$ in the same manner as described above for the Half-Rate Variant 3 data packet.

The output structure of the Half-Rate Variant 4 data packet is shown in FIG. 11B, where to enable transmission a data-enabled encoder maps the component fields shown in FIG. 11A into the 4 bit vectors $û_0, û_1 \ldots û_3$ as shown in FIG. 11A, where bit positions within each vector follow the conventions used in TIA-102BABA. The bit vector $û_0$ consists of the 8 most significant bits of the bit packet ID field, $I_8 I_7 \ldots I_1$ interlaced with the 4 bit packet type field, $T_3 T_2 T_1 T_0$. Next, the first 23 bits of the data message field, $M_{23} M_{22} \ldots M_1$ are output in bit vectors $û_1$ and $û_2$. Finally, bit vector $û_3$ includes the last bit of the data message, $M_0$, followed by the LSB of the packet ID field, $I_0$, and ending with the 12 error control bits $P_{11} P_{10} \ldots P_0$. After constructing all 4 of these bit vectors the data-enabled encoder applies Golay coding, bit modulation and interleaving as shown in FIG. 4A to produce a final 72 output frame which is suitable for transmission over the $P_{25}$ Phase 2 air interface.

One feature of the Variant 4 data packet is that a portion of the packet ID bits are placed into the bit vectors where the gain bits are normally carried in a Half-Rate voice frame. This causes the gain to be decoded to the minimum value (i.e., zero) when such a data packet is received, resulting in a very low level signal. This improves voice quality by lowering the perceived effect of any perturbations in the decoded voice signal caused by the presence of the non-voice data in the voice bit stream. Furthermore, a data-enabled decoder uses the Variant 4 packet ID field (0x000) to identify that a received frame contains non-voice data since the represented combination of a near maximum fundamental frequency value with a near minimum gain value does not regularly occur during Half-Rate voice frames. Upon detection, a data-enabled decoder will preferably perform error control decoding using the Golay codes shown in FIG. 4A in combination with the additional error control data (i.e., the 12 additional error control bits denoted as $P_{11}$ $P_{10}$ ... $P_0$) applied by the data-enabled encoder for a Half-Rate Variant 3 data packet. The data-enabled decoder then reconstructs the component fields of the data packet and outputs this data to the non-voice application.

One non-voice application of interest is location data that is divided into latitude, longitude, altitude, time and other information. Since the total extent of this information may exceed the number of message data bits in a non-voice data packet, a packet type field may be used to identify the data content of each non-voice data packet. For example, some non-voice data packets may contain just high resolution latitude and longitude data while other frames may contain altitude data plus localized latitude and longitude data relative to a known region (identified from the high resolution data or other known information). In addition, if the data message is longer than the packet data message field (N=48 bits for Full-Rate Variants 1 and 2, and N=24 bits for Half-Rate Variants 3 and 4), then the packet type field may identify the portion of the message (first N bits, second N bits, etc. . . . ) that the current frame contains. For example, consider a 96 bit data message, where using the described packet structures for Full-Rate (N=48) or Half-Rate (N=24), the 96 bit message is divided into 2 (Full-Rate) or 4 (Half-Rate) segments, and the packet type field identifies which segment is contained in the current voice frame. Dividing a single message over multiple voice frames reduces the message rate that can be transmitted, while allowing flexibility in the length of the messages.

In typical implementations, data messages are normally 48 bits long, and in the case of Half-Rate Variants 3 and 4, the message is split into two segments and Type bit $T_3$=0 for the first half of a data message and $T_3$=1 for the second half of the data message. For all the Variants, the remaining three packet Type bits $T_0$, $T_1$ and $T_2$ are used to convey the type of data contained in data message as shown in Table 2, where data messages marked as reserved are not presently defined and for future use (for example to carry time or other types of positioning data).

TABLE 2

| Packet Type Bits | | | |
|---|---|---|---|
| $T_0$ | $T_1$ | $T_2$ | Data Message |
| 0 | 0 | 0 | High resolution longitude and latitude data |
| 0 | 0 | 1 | Altitude data plus localized longitude and latitude data |

TABLE 2-continued

| Packet Type Bits | | | |
|---|---|---|---|
| $T_0$ | $T_1$ | $T_2$ | Data Message |
| 0 | 1 | 0 | reserved |
| 0 | 1 | 1 | reserved |
| 1 | 0 | 0 | reserved |
| 1 | 0 | 1 | reserved |
| 1 | 1 | 0 | reserved |
| 1 | 1 | 1 | reserved |

As illustrated in Table 2, Packet Type ($T_0$ $T_1$ $T_2$)=0x0 is associated with high resolution latitude and longitude data. In packets of this type, latitude data is assigned 23 bits and longitude data is assigned 24 bits. In Full-Rate Variant 1 and Variant 2 data packets, the latitude data is carried in $M_{47}$ (MSB) to $M_{25}$ (LSB) and the longitude data is carried in $M_{24}$ (MSB) to $M_1$ (LSB) while the last data message bit $M_0$ is an unused spare. In the Half-Rate Variant 3 and 4 data packets, latitude data is contained in the first half of the data message with $T_3$=0, the latitude data in $M_{23}$ (MSB) to $M_1$ (LSB), and the last data message bit $M_0$ is an unused spare. Similarly, in the Half-Rate Variant 3 and 4 data packets, longitude data is contained in the second half of the data message with $T_3$=1, and the longitude data in $M_{23}$ (MSB) to $M_0$ (LSB).

As further illustrated in Table 2, Packet Type ($T_0$ $T_1$ $T_2$)=0x1 is associated with altitude data plus localized latitude and longitude data. Localized latitude and longitude data is generated from the least significant 18 bits of the high resolution latitude and longitude data, respectively, with the assumption that the most significant bits of the latitude and longitude are known either from a prior transmission of high resolution data or because of a limited geographical coverage area. In packets containing altitude data plus localized latitude and longitude data, altitude data is assigned 11 bits while latitude and longitude data are each assigned 18 bits. In Full-Rate Variant 1 and Variant 2 data packets, the altitude data is carried in $M_{47}$ (MSB) to $M_{37}$ (LSB), the latitude data is carried in $M_{36}$ (MSB) to $M_{19}$ (LSB) the longitude data is carried in $M_{18}$ (MSB) to $M_1$ (LSB) and the last data message bit $M_0$ is an unused spare. In the Half-Rate Variant 3 and 4 data packets, the first half of the data message with $T_3$=0 carries the 5 Most significant bits of the altitude data in $M_{23}$ (MSB) to $M_{19}$ (LSB), the localized latitude data in $M_{18}$ (MSB) to $M_1$ (LSB), and the last data message bit $M_0$ is an unused spare. Similarly, in Half-Rate Variant 3 and 4 data packets, the second half of the data message with $T_{3=1}$, carries the 6 LSBs of the altitude data in $M_{23}$ (MSB) to $M_{18}$ (LSB), and the localized longitude data in $M_{17}$ (MSB) to $M_0$ (LSB).

Packet Type ($T_0$ $T_1$ $T_2$)=0x0 uses 24 bits for longitude and 23 bits for latitude which covers the entire surface of the earth and provides sufficient accuracy for most land mobile radio applications. Longitude is represented in the range from [0.0, 360.0] degrees while latitude is represented in the range from [0.0, 180.0] degrees giving a resolution of 0.0002146 degrees in both longitude and latitude. This equates to positional accuracy to within +/−1.2 meters. Packet Type ($T_0$ $T_1$ $T_2$)=0x1 uses 11 bits for altitude and represents the range of [0, 6144] meters with and altitude accuracy of +/−1.5 meters. This Packet Type also uses 18 bits for localized longitude and latitude data having the same +/−1.2 meter accuracy but limiting coverage to 5.625 degrees in both longitude and latitude. This divides the earth into 2048 local cells and information on which cell the localized data relates to can either be inferred from the geographical limits on the systems coverage area (for example limiting coverage to one particular state or states) or can be provided by sending occasional high resolution longitude and latitude packets (i.e. $T_0$ $T_1$ $T_2$=0x0) to convey the local cell to which the localized data pertains.

Other packet types may contain additional data beyond, latitude, longitude and altitude. Furthermore, the division of bits within a data packet can be modified to support more or less accuracy, additional error correction or detection bits, or other features.

While the techniques are described largely in the context of a MBE vocoder, the described techniques may be readily applied to other systems and/or vocoders. For example, other MBE type vocoders may also benefit from the techniques regardless of the bit rate or frame size. In addition, the techniques described may be applicable to many other speech coding systems that use a different speech model with alternative parameters (such as STC, MELP, MB-HTC, CELP, HVXC or others).

Other implementations are within the scope of the following claims.

What is claimed is:

1. A method for embedding non-voice data in a voice bit stream that includes frames of voice bits, the method comprising:
   selecting a frame of voice bits to carry the non-voice data;
   placing non-voice identifier bits in a first portion of the voice bits in the selected frame; and
   placing the non-voice data in a second portion of the voice bits in the selected frame;
   wherein said non-voice identifier bits are employed to reduce a perceived effect of the non-voice data on audible speech produced from the voice bit stream.

2. The method of claim 1, wherein the first portion of voice bits in the selected frame includes voice bits used to represent the gain, level or amplitude of the frame.

3. The method of claim 2, wherein the frames of voice bits represent MBE speech model parameters, and wherein the first portion of voice bits in the selected frame include voice bits used to represent the fundamental frequency or pitch period of the frame, and the non-voice identifier bits carry information corresponding to a short pitch period.

4. The method of claim 3, wherein the second portion of the voice bits in the selected frame include voice bits used to represent the spectral magnitudes or V/UV decisions.

5. The method of claim 4, wherein the non-voice data includes location or position data.

6. The method of claim 5, wherein the non-voice data includes longitude, latitude or altitude information.

7. The method of claim 1, wherein selecting the frame of voice bits to carry the non-voice data comprises comparing speech parameters for the frame to speech parameters for a preceding frame to produce a measure of similarity between the speech parameters for the frame and the preceding frame, and selecting the frame of voice bits to carry the non-voice data when the measure of similarity satisfies a threshold condition.

8. The method of claim 7, wherein the non-voice identifier bits carry information corresponding to an invalid voice frame.

9. The method of claim 8, wherein the speech parameters for the frame voice include MBE speech model parameters and the first portion of voice bits in the selected frames include voice bits used to represent the fundamental frequency or pitch period of the frame and the second portion of the voice bits in the selected frame includes voice bits used to represent the spectral magnitudes or voicing decisions.

10. The method of claim 9, wherein quantizer state information for the MBE speech model parameters is not updated during frames in which the non-voice identifier bits carry information corresponding to an invalid voice frame.

11. The method of claim 9, wherein the measure of similarity comprises a distance measure between the spectral magnitudes of the frame and the spectral magnitudes of the preceding frame.

12. The method of claim 7, wherein the threshold condition changes based on a time interval between the frame and an earlier frame selected to carry non-voice data.

13. A speech encoder configured to embed non-voice data in a voice bit stream that includes frames of voice bits, the speech encoder being configured to:
   select a frame of voice bits to carry the non-voice data;
   place non-voice identifier bits in a first portion of the voice bits in the selected frame; and
   place the non-voice data in a second portion of the voice bits in the selected frame;
   wherein said non-voice identifier bits are employed to reduce a perceived effect of the non-voice data on audible speech produced from the voice bit stream.

14. A handset or mobile radio including the speech encoder of claim 13.

15. A base station or console including the speech encoder of claim 13.

* * * * *